United States Patent
Keaveney et al.

(10) Patent No.: US 10,948,356 B1
(45) Date of Patent: Mar. 16, 2021

(54) MEASURING WAVELENGTH OF LIGHT

(71) Applicant: Quantum Valley Ideas Laboratories, Waterloo (CA)

(72) Inventors: James Keaveney, Waterloo (CA); Geoffrey Gordon Gillett, Waterloo (CA); Chang Liu, Waterloo (CA); Jennifer Ann Joe Erskine, Waterloo (CA); James P. Shaffer, Kitchener (CA)

(73) Assignee: Quantum Valley Ideas Laboratories, Waterloo (CA)

( * ) Notice: Subject to any disclaimer, the term of this patent is extended or adjusted under 35 U.S.C. 154(b) by 0 days.

(21) Appl. No.: 16/907,469

(22) Filed: Jun. 22, 2020

(51) Int. Cl.
*G01B 9/02* (2006.01)
*G01J 9/02* (2006.01)

(52) U.S. Cl.
CPC .......... *G01J 9/0246* (2013.01); *G01B 9/0203* (2013.01); *G01B 9/0209* (2013.01)

(58) Field of Classification Search
CPC ............... G01J 9/0246; G01B 9/02029; G01B 9/02031; G01B 9/02049; G01B 9/0209
See application file for complete search history.

(56) References Cited

U.S. PATENT DOCUMENTS

| | | | | |
|---|---|---|---|---|
| 4,173,442 A | * | 11/1979 | Snyder ................. | G01J 9/0246 356/454 |
| 4,191,473 A | * | 3/1980 | Hansch .................. | G01J 3/18 356/300 |
| 5,420,877 A | | 5/1995 | Sandstrom | |
| 5,543,916 A | * | 8/1996 | Kachanov ............. | G01J 9/0246 356/399 |
| 6,667,804 B1 | | 12/2003 | Kleinschmidt | |

(Continued)

FOREIGN PATENT DOCUMENTS

DE       4114407       11/1992

OTHER PUBLICATIONS

Ciddor, "Refractive index of air: new equations for the visible and near infrared", Applied Optics 35, 9, Mar. 20, 1996, 8 pgs.

(Continued)

*Primary Examiner* — Jonathan M Hansen
(74) *Attorney, Agent, or Firm* — Henry Patent Law Firm PLLC

(57) ABSTRACT

In a general aspect, a wavelength of light is measured. In some aspects, a wavelength measurement system includes an interferometer, a camera system, a sensor and a control system. The interferometer includes two reflective surfaces and a transmission medium between the two reflective surfaces. The interferometer is configured to receive an optical signal from a laser and produce an interferogram in response. The camera system is configured to receive the interferogram from the interferometer and generate interferogram data in response. The interferogram data represents the interferogram received from the interferometer. The sensor is configured to sense an environmental parameter of the transmission medium and generate sensor data in response. The control system is configured to perform operations including, receiving the interferogram data from the camera system and the sensor data from the sensor; and computing a wavelength of the laser based on the interferogram data and the sensor data.

30 Claims, 11 Drawing Sheets

(56) References Cited

U.S. PATENT DOCUMENTS

2018/0102627 A1* 4/2018 Parker ................ G02B 6/29398
2020/0183195 A1* 6/2020 Morrison .............. G02F 1/0147

OTHER PUBLICATIONS

Gray, et al., "Simple Compact Fizeau Wavemeter", Applied Optics 25, 8, Apr. 15, 1986, 5 pgs.

Hughes, et al., "Measurements and their Uncertainties", Oxford University Press, 2010, 153 pgs.

* cited by examiner

MEASURING WAVELENGTH OF LIGHT

BACKGROUND

The following description relates to measuring the wavelength of light.

Lasers are precise tools for manipulating matter and making measurements. In many cases, properties, e.g., frequencies or wavelengths, of lasers are required to be precisely tuned to atomic resonances in order to use them in commercial devices. Examples of such devices include atomic clocks, gravitometers, electric and magnetic field sensors, and accelerometers. One of the major challenges in such devices is to make precise, absolute frequency measurements with a high precision (e.g., ~1 MHz) from the ultraviolet to the infrared. Currently, wavelength measurements with such precision rely upon power-consuming environmental control and stabilization techniques, which greatly limits the use of such techniques outside of laboratory environments.

DETAILED DESCRIPTION

Figure 1:
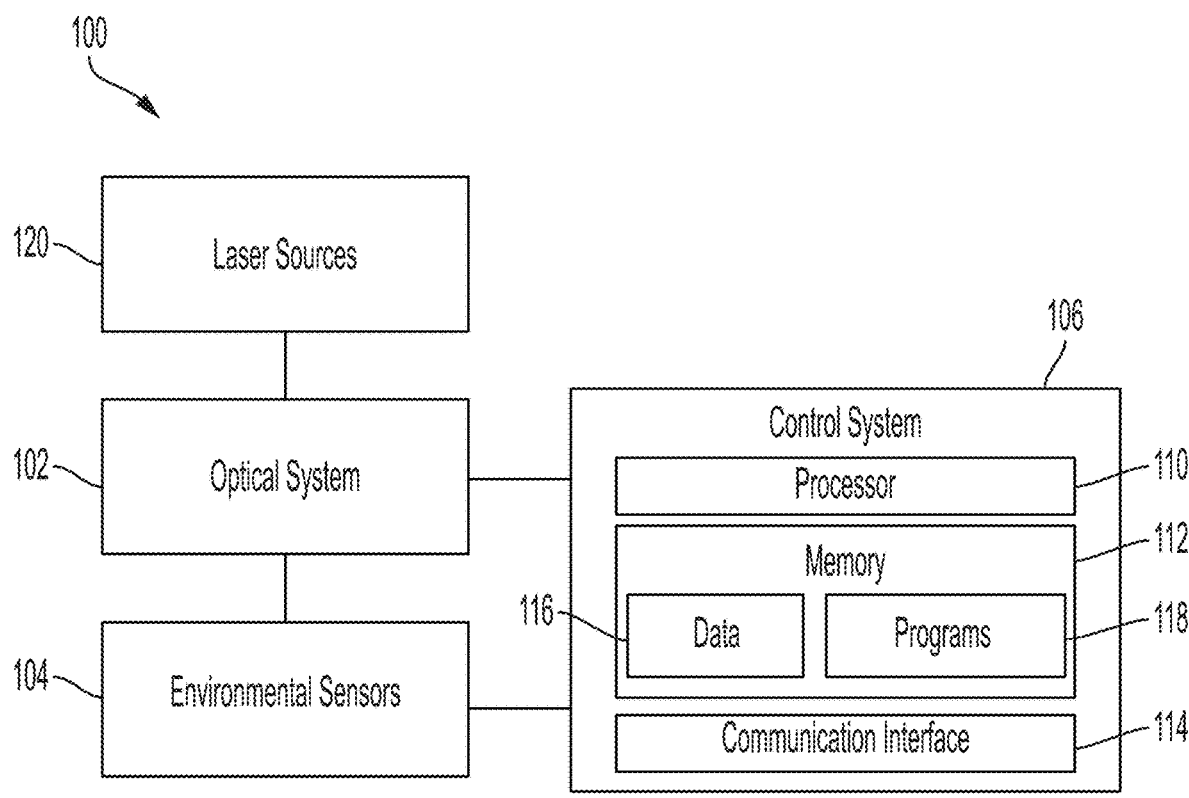
FIG. 1 is a schematic diagram of an example system for wavelength measurement.

Measurement of laser light properties, such as a wavelength or frequency, is critical in many applications, for example in high-precision experiments and, increasingly, in devices where optical signals form an integral part of a measurement or detection system. In some aspects of what is described here, a wavelength measurement system includes an optical system and one or more environmental sensors. In some implementations, the optical system includes a series of optical elements that define one or more beam paths between a laser source and a camera system. In some implementations, the optical system includes one or more interferometers producing a spatial interferogram, which can be used for wavelength measurement. In some instances, the one or more environmental sensors, which are capable of monitoring one or more environmental parameters of a transmission medium for laser light, are positioned in the one or more interferometers. In some instances, the one or more environmental parameters are used to determine a refractive index of the transmission medium and to correct the environmental effect on the measured wavelength. In some instances, the environment parameters are used to correct for the thermal expansion of the interferometer.

In some implementations, the methods and systems described herein can provide technical advantages over, or improvements to, existing technologies. For example, the methods and systems may not require a passive isolation to the system, power-consuming environmental control, or an active atmospheric stabilization to obtain high accuracy and precision. In another example, the methods and systems may avoid using a permanent reference laser for intermittent recalibration to compensate a long-term drift. In yet another example, the systems may have a small form factor, e.g., occupying a small volume or footprint, and may be suitable for portable devices where power consumption is a key design constraint. In some cases, a combination of these advantages and potentially other advantages and improvements may be obtained.

In some aspects of what is described here, the one or more interferometers of the wavelength measurement system may be implemented as dual Fizeau interferometers. However, other types and combinations interferometers are possible. In some aspects of what is described here, the dual Fizeau interferometers with two interferometer cavities are constructed and used simultaneously to provide a reliable and efficient wavelength measurement. In some implementations, an optimization model based on a minimum chi-square method may be performed on the interferograms obtained using the two interferometer cavities with two different interferometer lengths, thereby allowing an unambiguous wavelength to be determined by finding a global minimum with high precision.

In some aspects of what is described here, the one or more environmental sensors are configured in proximity to the interferometer cavities for monitoring the environmental parameters of the transmission medium in the interferometer cavities. In some implementations, the environmental parameters may include temperature (T), atmospheric pressure (P), and humidity (H). In some examples, the environmental sensors may further include a carbon dioxide ($CO_2$) sensor to determine a concentration of $CO_2$ ($C_{CO_2}$) in the transmission medium.

In some aspects of what is described here, the wavelength measurement system further includes a control system, which may be used, for example, to operate the optical system to switch between different laser sources. A reference laser source may be used in a calibration process, and a test laser source may be used in a wavelength measurement process. In some instances, the control system may receive data for signal processing. For example, the control system may communicate with the camera of the optical system to receive spatial interferogram data. The control system may also communicate with the environmental sensors to receive data representing environmental parameters of the transmission medium (e.g., air) in the interferometer cavities. In some implementations, the control system may use the data to evaluate the refractive index of the transmission medium. In some instances, the control system may be used to implement one or more aspects of the systems and techniques described in relation to FIGS. 1-3 and 5-6. However, the control system may also perform other types of operations. In some variations, the control system may implement a thermal expansion model to correct for the thermal expansion of optical elements in the optical system.

FIG. 1 presents a schematic diagram of an example wavelength measurement system 100. The example wavelength measurement system 100 includes an optical system 102, environmental sensors 104, and a control system 106. However, additional features are possible for the example wavelength measurement system 100.

In some implementations, the optical system 102 may be coupled to two or more laser sources 120, such as a reference laser source and a test laser source. In some implementations, the reference laser source may be used to generate a reference laser beam with a known wavelength. In some implementations, the reference laser source may be used for calibrating the wavelength measurement system 100. In some implementations, the test laser source may generate a laser beam with an unknown wavelength that can be measured by the example wavelength measurement system 100 prior to being used in other applications.

In some implementations, the optical system 102 may include a series of optical elements that define one or more beam paths between the two or more laser sources 120 and a camera system. In some examples, the series of optical elements in the optical system 102 may include an optical switch, one or more lenses, one or more mirrors, a beam splitter, and one or more interferometers. In some implementations, the optical system 102 may be implemented as the optical system 204 shown in FIG. 2. However, other implementations of the optical system 102 are possible. In some implementations, the optical switch may be configured to select and route an input laser beam at a first input port or a second laser beam at a second input port to an output port of the optical switch. In some implementations, the laser beam from the output port of the optical switch is collimated by the one or more lenses.

In some implementations, a collimated laser beam exiting the one or more lenses may be guided through the interferometers. In some instances, the interferometers including at least two different interferometer lengths can facilitate reliable and efficient fitting of the wavelength of the test laser beam. In some instances, the interferometers may include dual Fizeau interferometers, Fabry-Perot interferometers, Michelson interferometers, or other types of interferometers. In certain implementations, the optical system 102 includes a camera system which may be configured at a position to optically couple to the interferometers. In some instances, the camera system may be used to detect one or more interferograms.

In some implementations, the environmental sensors 104 may include at least one of a temperature sensor, an atmospheric pressure sensor, and a humidity sensor. In some implementations, the environmental sensors 104 are configured in proximity to the interferometer in the optical system 102. In some implementations, the environmental sensors 104 may be configured for in-situ monitoring of environmental parameters of the transmission medium in the interferometer cavities in order to determine a refractive index of a transmission medium in the interferometers, e.g., air. In some implementations, sensor data representing values of the environmental parameters may be produced by the environmental sensors, including a temperature (T), an atmospheric pressure (P), and a humidity (H). In some implementations, the environmental sensors 104 may further include a carbon dioxide ($CO_2$) sensor to generate the sensor data including $CO_2$ concentration data in the transmission medium. In some implementations, the refractive index may be determined by the control system 106 using a refractive index computation algorithm. In some implementations, the environmental sensors 104 may include additional temperature sensors, e.g., positioned on the interferometers, to compensate a thermal expansion effect in the interferometer.

In the example shown in FIG. 1, the control system 106 includes a processor 110, memory 112, and a communication interface 114. The control system 106 may include additional components, such as, for example, input/output controllers, communication links, power for the optical system or the environmental sensors, a display device, and an input device. In some examples, the control system 106 may be used to operate the optical switch in the optical system 102 to switch between the different input laser sources. In some examples, the control system 106 may be used to communicate with the camera system of the optical system 102 and the environmental sensors 104 through the communication interface 114. For example, the control system 106 may receive data 116 for signal processing (e.g., performing an example process 500 for calibrating the wavelength measurement system as described in relation to FIG. 5 or performing an example process 600 for wavelength measurement as described in relation to FIG. 6). In some instances, the control system 106 may be used to implement one or more aspects of the systems and techniques described with respect to FIGS. 2-6, or to perform other types of operations.

In some implementations, some of the processes and logic flows described in this specification may be performed by one or more programmable processors, e.g. processor 110, executing one or more computer programs to perform actions by operating on input data and generating output. For example, the processor 110 may run the programs 118 by executing or interpreting scripts, functions, executables, or other modules contained in the programs 118. In some implementations, the processor 110 may perform one or more of the operations described, for example, with respect to FIGS. 5 and 6.

In some implementations, the processor 110 may include various kinds of apparatus, devices, and machines for processing data, including, by way of example, a programmable data processor, a system on a chip (SoC, or multiple ones, or combinations, of the foregoing). In certain instances, the processor 110 may include special purpose logic circuitry, e.g., an FPGA (field programmable gate array), an ASIC (application specific integrated circuit), or a Graphics Processing Unit (GPU). In some instances, the processor 110 may include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some examples, the processor 110 may include, by way of example, both general and special purpose microprocessors, and processors of any kind of digital computer.

In some implementations, the processor 110 may include both general and special purpose microprocessors, and processors of any kind of digital computer. Generally, a processor 110 will receive instructions and data from a read-only memory or a random-access memory or both (e.g., memory 112). In some implementations, the memory 112 may include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor 110 and the memory 112 may be supplemented by, or incorporated in, special purpose logic circuitry.

In some implementations, the data 116 stored in the memory 112 may include data received from the camera system of the optical system 102 and from the environmental sensors 104. In some implementations, the data 116 stored in the memory 112 may also include information associated with the reference laser beam (e.g., wavelength or frequency, Gaussian envelope parameters, etc.). In some implementations, the programs 118 may include software applications, scripts, programs, functions, executables, or other modules that are interpreted or executed by the processor 110. In some instances, the programs 118 may include machine-readable instructions for receiving data of environmental parameters of the transmission medium (e.g., air) in the interferometer and for performing a wavelength measurement process to evaluate the refractive index of the transmission medium. In some instances, the programs 118 may include machine-readable instructions for controlling the optical switch of the optical system 102 to switch between the different input laser sources.

In some instances, the programs 118 may access the data 116 from the memory 112, from another local source, or from one or more remote sources (e.g., via a communication link). In some instances, the programs 118 may generate output data and store the output data in the memory 112, in another local medium, or in one or more remote devices (e.g., by sending the output data via the communication interface 114). In some examples, the programs 118 (also known as, software, software applications, scripts, or codes) can be written in any form of programming language, including compiled or interpreted languages, declarative or procedural languages. In some implementations, the programs 118 can be deployed to be executed on one computer or on multiple computers that are located at one site or distributed across multiple sites and interconnected by a communication network. For instance, the programs 118 may operate in the cloud, and the control system 106 may access the programs 118 through an Internet connection.

In some implementations, the communication interface 114 may include any type of communication channel, connector, data communication network, or other link. In some instances, the communication interface 114 may provide communication channels between the control system 106 and the optical system 102, the environmental sensors 104, or other systems or devices. In some instances, the communication interface 114 may include a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS, etc.) among others. In some examples, such communication may occur, for example, through a radio-frequency transceiver or another type of component. In some instances, the communication interface 114 may include a wired communication interface (e.g., USB, Ethernet, etc.) that can be connected to one or more input/output devices, such as, for example, a keyboard, a pointing device, a scanner, or a networking device such as a switch or router, for example, through a network adapter.

Figure 2A:
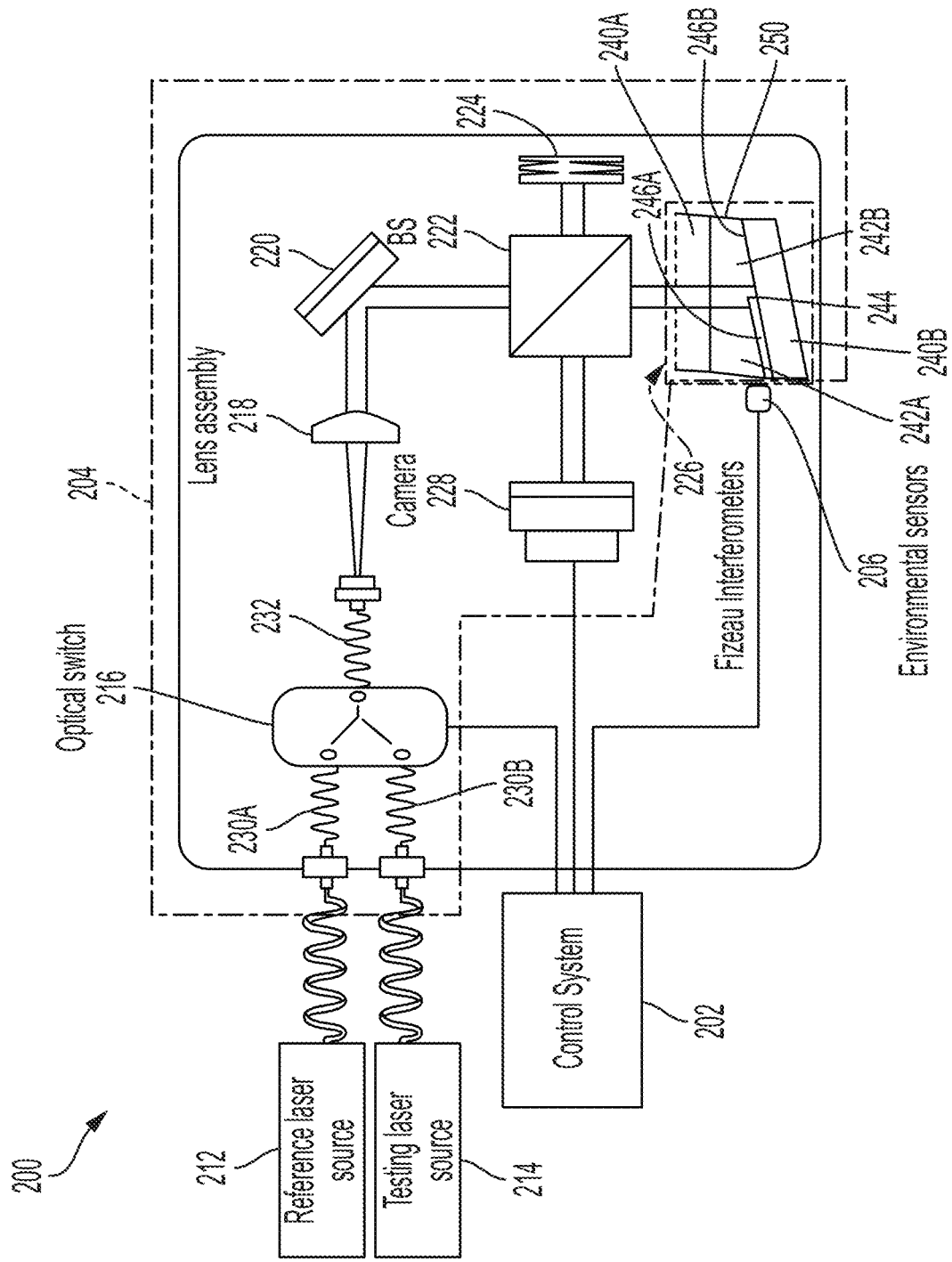
FIG. 2A is a schematic diagram of an example system for wavelength measurement.
Figure 2B:
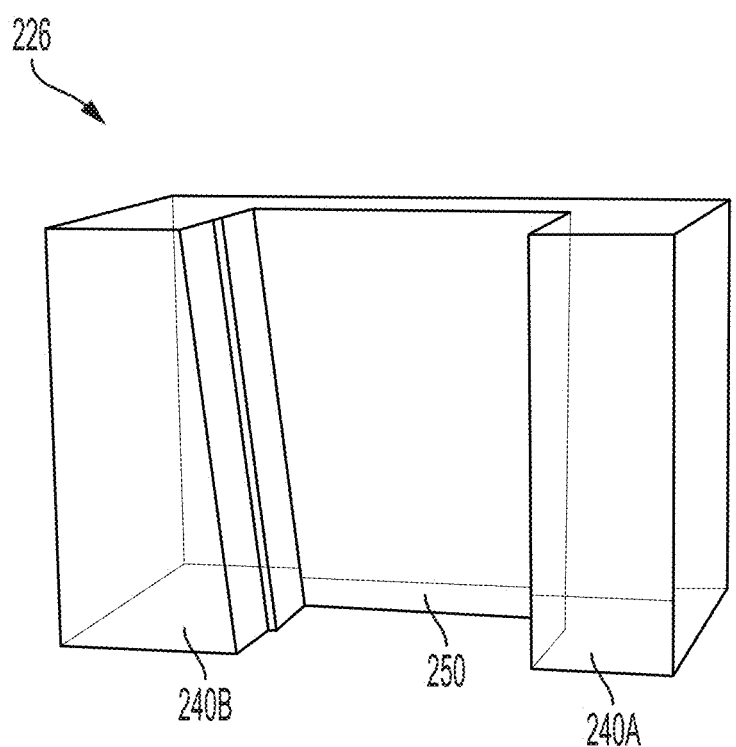
FIG. 2B is a schematic diagram of an example interferometer.

FIG. 2 presents a schematic diagram of an example wavelength measurement system 200 for wavelength measurement. In some instances, the example wavelength measurement system 200 shown in FIG. 2 may be used for performing a wavelength measurement, e.g., the processes described in relation to FIGS. 5 and 6. In the example shown in FIG. 2, the wavelength measurement system 200 includes a control system 202, an optical system 204 and environmental sensors 206. As shown in FIG. 2, the optical system 204 includes a series of optical elements that define one or more beam paths between one or more lasers and a camera system. In the example shown, the series of optical elements in the optical system 204 includes an optical switch 216, a lens assembly 218, a mirror 220, a beam splitter 222, a beam stop 224, an interferometer 226, and a camera system 228. In some examples, the wavelength measurement system 200 may include additional or different components, and the components may be arranged as shown or in another manner.

In some instances, the optical system 204 may receive one or more laser beams from a reference laser source 212 and a test laser source 214. In the example shown in FIG. 2, the reference laser source 212 may be used to generate a reference laser beam with a known frequency. In some implementations, the test laser source 214 may be used to generate a laser beam with unknown frequency/wavelength that needs to be measured before being used in other applications. In some implementations, the reference laser source 212 may be used for recalibration or in-situ calibration purposes, for example, after a substantial reconfiguration to the system 200 is performed. However, recalibration using the reference laser source may not be required once the system 200 is calibrated.

In some implementations, the reference laser source 212 may be actively stabilized, e.g., locked to an atomic frequency reference, in which frequency intervals between some atomic transitions may be known with high accuracy. For example, optical absorption caused by the D1 transition (the $6^2S_{1/2} \rightarrow 6^2P_{1/2}$ transition) or the D2 transition (the $6^2S_{1/2} \rightarrow 6^2P_{3/2}$ transition) in a cesium (Cs) atom can be used to provide an absolute frequency reference for calibrating the example wavelength measurement system 200. In some examples, the reference laser source 212 may provide high precision and frequency stability better than 3 parts in $10^{10}$, or 100 kHz precision for an approximately 300 THz frequency. In some other examples, the reference laser source 212 may contain another type of laser source with different precision. For example, a HeNe laser with reduced precision can be used as the reference laser source 212. In one example, the reference laser source 212 may output a reference laser beam with a wavelength at 852.356 nm, which corresponds to an optical frequency of 351.722 THz. In some instances, the reference laser source 212 is locked to an atomic transition of Cs using an ultra-stable optical cavity, with a variation in wavelength less than 0.2 fm (e.g., a variation in frequency less than 100 kHz).

In some implementations, the optical switch 216 can selectively switch optical signals from one input port to another. The optical switch 216 may be an optical router or a mechanically actuated mirror. In some variations, the optical switch 216 may operate by a mechanical method, such as shifting from one fiber coupled to a laser source (e.g., a reference laser source 212) to another fiber coupled to a different laser source (e.g., a test laser source 214). However, in many implementations, the optical switch 216 includes a microelectromechanical system (MEMS) optical switch. In some examples, the optical switch 216 may include one or more mirrors, tilting angles of which may be digitally controlled by the control system 202. In some examples, the optical switch 216 may have two or more input ports and one or more output ports. In the example system 200 shown in FIG. 2, the optical switch 216 may route a first laser beam at a first input port 230A or a second laser beam at a second input port 230B to an output port 232. In some examples, the optical switch 216 may provide the same optical path to the input laser beams. In certain examples, the optical switch can allow multiple lasers to be measured. In some implementations, the optical switch 216 may be capable of coupling to various optical fibers, e.g., single-mode optical fibers, multi-mode optical fibers, or polarization-maintaining optical fibers. In some examples, the optical switch 216 may be selected according to the frequency range of the input laser beams. In some examples, the optical switch 216 may have low insertion loss and may operate at low voltage to prevent additional thermal load to the example system 200.

In some implementations, the laser beam from the output port 232 of the optical switch 216 may be collimated by the lens assembly 218. In some implementations, the lens assembly 218 contains one or more collimating lenses, which are oriented in a direction perpendicular to the incident direction of the laser beam from the output port 232. In some implementations, the collimating lenses 218 are achromatic to minimize beam divergence at different wavelengths.

In some implementations, optical fibers may be used to guide the laser beam from the laser sources 212, 214 to the optical switch 216. In some implementations, the optical fibers may include single-mode optical fibers to improve the quality of the laser beam or multi-mode optical fibers to maintain the intensity of the laser beam. In some implementations, an optical fiber may be also used to guide the laser beam from the optical switch 216 to the lens assembly 218. In certain instances, the optical fibers may be implemented as polarization-maintaining optical fibers, photonic-crystal fibers or another type of optical fiber.

In some implementations, the collimated laser beam exiting the lens assembly 218 is then guided through the beam splitter 222. In some instances, prior to the collimated laser beam propagating through the beam splitter 222, the collimated laser beam may be redirected by the first mirror 220 along a different direction (e.g., from a horizontal direction to a vertical direction). In some instances, the beam splitter 222, which is partially reflective and partially transmissive, is used to split the incident laser beam into two beams, each along a separate path (e.g., a transmitted path and a reflected path). In some examples, the beam stop 224 may be placed in the path (e.g., the reflected path) of the beam splitter 222. In some examples, the beam stop 224 is a beam dump which prevents the laser on the reflected path from contributing to the interferograms. In some examples, the interferometer 226 may be positioned in the other path (e.g., the transmitted path) of the beam splitter 222.

In some implementations, the interferometer 226 may include at least two glass pieces facing each other. In some instances, the interferometer 226 may include ultra-low-expansion glass. In the example shown in FIG. 2, a first glass piece 240A is configured perpendicular to the incident laser beam and the second glass piece 240B is angled by a wedge angle relative to the perpendicular direction (e.g., as shown in the schematic ray diagrams of FIGS. 7A-7C). In some instances, a first surface of the first glass piece 204A facing the incident laser beam may be coated with one or more anti-reflective coatings for enhanced operation at a specific wavelength or a set of wavelengths. In some instances, respective thicknesses of the one or more anti-reflective coatings may be determined by a wavelength range, and refractive indices of the transmission medium and the first glass piece 204A. In some instances, the first surface of the first glass piece 240A may be uncoated for broadband operation. In some instances, a second, opposing surface of the first glass piece 240A and a first surface of the second glass piece 240B which are configured facing each other, are coated with a reflective coating. In some implementations, the reflective coating may include a layer of metal, metal alloy or dielectric materials. For example, the reflective coating may include aluminum, silver, gold, chrome, copper, nickel, titanium, and Inconel or a layered dielectric including silicon dioxide ($SiO_2$) and titanium dioxide ($TiO_2$).

As shown in FIG. 2, two interferometer cavities 242A, 242B with two different interferometer lengths are created by creating a step 244 on the first surface of the second glass piece 240B. In some implementations, a portion of the transmitted laser beam from the beam splitter 222 is incident on a wedged surface 246A of the step 244 and a portion of the transmitted laser beam is incident on a bottom wedged surface 246B. The bottom wedged surface 246B is displaced from the wedged surface 246A by the step 244. In some instances, the wedged surface 246A is displaced by 0.39 mm from the bottom wedged surface 246B by the step 244, e.g., the height of the step 244 is 0.39 mm. The reflected laser beam from the wedged surface 246A and the bottom wedged surface 246B can effectively create the two interferometer cavities 242A, 242B, e.g., dual Fizeau interferometers. In some examples, a difference in interferometer lengths of the dual Fizeau interferometers is the height of the step 244. For example, the two interferometer lengths are 20.00 and 19.61 mm. In some instances, the reflected laser beam from the interferometers may be spatially patterned with two separate interference patterns (e.g., interferograms), which may have different periodicity and/or phase owing to the different interferometer lengths (e.g., the interferograms 402A, 402B shown in FIG. 4A). In addition, the dual Fizeau interferometers may be constructed as a single monolithic piece, e.g. from a single piece of glass, or several pieces that are fused together. In some implementations, the interferometers may include more than two interferometer cavities and the interferometer cavities may be created in another manner, e.g., different wedge angles.

In some implementations, the interferograms from the interferometers 226 can be captured by the camera system 228. In some instances, each of the interferograms may include a series of interference fringes. To a first-order approximation, the series of interference fringes is generated when the interferometer length coincides with $m\lambda/2$, where m is an integer representing an interference order, and is the wavelength of the laser beam. In some implementations, the spacing and positions of the interference fringes may be used to calculate the wavelength by inferring m, if the interferometer length is known. In some instances, the interferometer lengths may be determined from a calibration process, e.g., the example process 500 described in relation to FIG. 5 or in another manner.

In some implementations, the camera system 228 may include an array of image sensors, each of which may be a Charge Coupled Device (CCD) sensor and a complementary metal-oxide semiconductor (CMOS) sensor. In certain implementations, the camera system 228 may be configured at a position in the example system 200 to receive the combined laser beams from the beam splitter 222 to record a full spatial intensity profile of the interferograms from the beam splitter 222.

In some implementations, the environmental sensors 206 may include one or more temperature sensors, one or more atmospheric pressure sensors, and one or more humidity sensors. In some implementations, the environmental sensors 206 are disposed in proximity to the interferometer 226. In some implementations, the environmental sensors 206 may be configured for in-situ monitoring of environmental parameters of the transmission medium in the interferometer cavities 242A, 242B, including temperature (T), atmospheric pressure (P), and humidity (H). In some instances, the environmental parameters monitored by the environmental sensors 206 may be used to determine the refractive index of the transmission medium (e.g., air) within the interferometer cavities 242A, 242B of the interferometer 226.

The environmental sensors 206 may be selected according to design requirements, including detection range, sensitivity, accuracy, response time, repeatability, size, and power consumption. In some implementations, the environmental sensors 206 are calibrated prior to measuring operations or in-situ by comparing to respective reference sensors, which have been accurately calibrated.

In some implementations, the environmental sensors 206 may further include one or more separate temperature sensors for measuring a temperature of the single monolithic piece of glass of the interferometer. In some implementations, the one or more separate temperature sensors can be used to measure a temperature of an interferometer spacer 250, which is used to separate the first and second glass pieces 240A, 240B. In some implementations, the temperature data of the interferometer generated by the one or more separate temperature sensors may be used in a thermal expansion model for compensating for a thermal expansion effect on the wavelength measurement. In some instances, the thermal expansion effect may be modeled on the entire monolithic piece of the interferometer using a linear model, a high-order model or in another manner. In certain examples, a linear model $\Delta L = \gamma \Delta T \cdot L$ can be used, where $\Delta L$ is the change in the interferometer length, $\gamma$ is the thermal expansion coefficient, $\Delta T$ is the change in temperature, and L is the interferometer length. In some instances, the thermal expansion coefficient in the linear model may be determined by applying a known laser frequency and holding the interferometer at controlled, different temperatures and determining the change in the interferometer length as the interferometer resonance shifts. In some instances, the thermal expansion effect may be calibrated, and the thermal expansion coefficient may be determined prior to performing a wavelength measurement. In some instances, thermal expansion effects on other geometries of the interferometer 226 especially when the interferometer is implemented in another manner may be also measured and calibrated, for example, the incident angle of the incident laser on the second glass piece 240B.

In some implementations, the environmental sensors 206 may be configured within a housing (not shown) of the example system 200, which may be used to enclose the example system 200 from dust accumulation. The example system 200 may or may not be hermetically sealed in the housing. In some examples, the example system 200 is configured without a housing and open to the environment.

In some implementations, different types of temperature sensors may be implemented, including contact and non-contact temperature sensors. In some implementations, a contact type temperature sensor may be a thermostat, a thermistor, a thin film resistive sensor, or a thermocouple. In some implementations, a humidity sensor may be a capacitive sensor, a resistive sensor, or a thermal conductivity sensor. In some implementations, an atmospheric pressure sensor may be an absolute pressure sensor, or a differential pressure sensor. In some examples, the atmospheric pressure sensor may be a MEMS Barometric pressure sensor that is capable of measuring atmospheric pressure using a small and flexible structure. In some examples, the MEMS Barometric pressure sensor may be used to measure dynamic or static air pressure within the interferometer cavities 242A, 242B. In some implementations, other types of environmental sensor may be used.

In some implementations, the environmental sensors 206 may further include one or more carbon dioxide ($CO_2$) sensors. In some examples, the one or more $CO_2$ sensors include a chemical gas sensor. In some instances, a chemical $CO_2$ gas sensor may be a MEMS $CO_2$ gas sensor that uses chemical sensitive layers to measure the $CO_2$ concentration levels in the interferometer cavities 242A, 242B. In some instances, other types of $CO_2$ gas sensor may be used according to its detection range and selectivity over other gas molecules.

Figure 5:
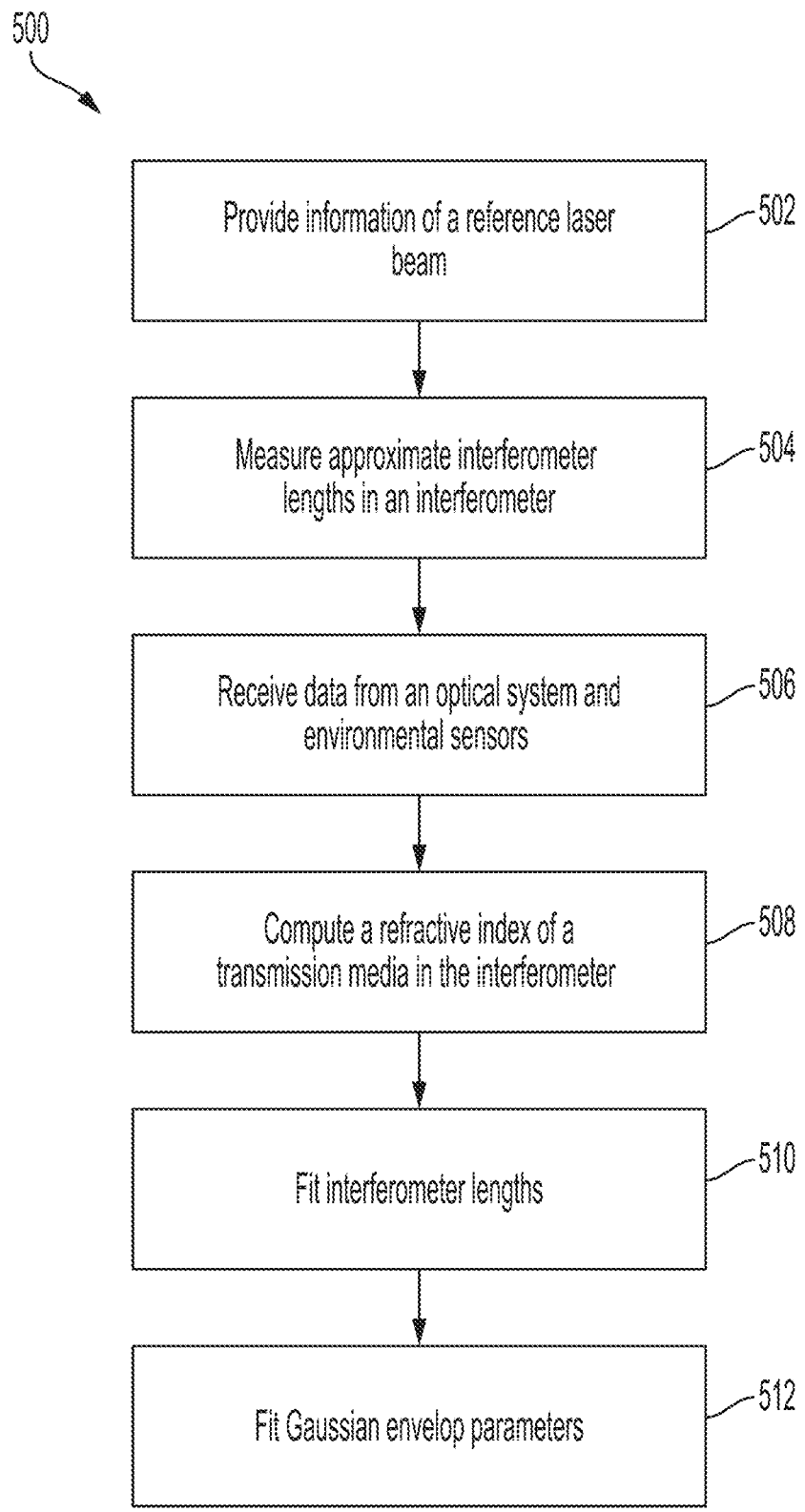
FIG. 5 is a flow chart showing an example process for calibrating a wavelength measurement system.
Figure 6:
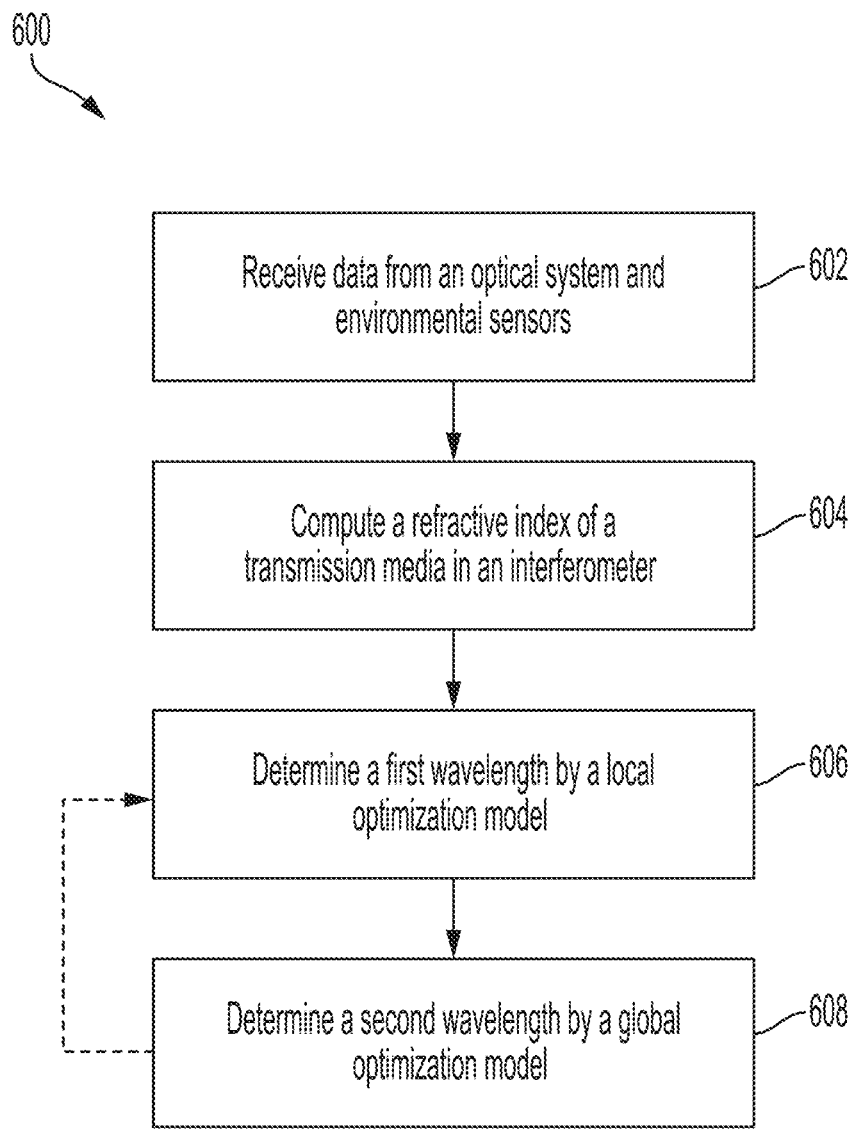
FIG. 6 is a flow chart showing an example process for performing a wavelength measurement.

In some implementations, sensor data representing values of the environmental parameters may be produced by the environmental sensors 206. In some implementations, the sensor data may be used in a calibration process and a wavelength measurement process (e.g., the example processes 500 and 600 described in relation to FIGS. 5 and 6). In some examples, the sensor data may be used to determine the refractive index of the transmission medium (e.g., air) in the interferometer cavities 242A, 242B. As shown in FIGS. 5 and 6, the calibration process and the wavelength measurement process may use the sensor data, the wavelength of the reference laser beam and the geometric parameters of the interferometer cavities (e.g., the interferometer lengths and the wedge angle) to determine the absolute wavelength of the test laser beam. However, other environmental parameters are possible.

In some implementations, the control system 202 may be used, for example, to operate the optical switch 216 in the optical system 204 to switch between receiving the different laser input sources. In some implementations, the control system 202 receives data for signal processing. For example, the control system 202 may communicate with the camera system 228 of the optical system 204 to receive interferogram data. For example, the control system 202 may communicate with the environmental sensors 206 to receive the sensor data. In some instances, the control system 202 may be used to implement one or more aspects of the systems and techniques described with respect to FIGS. 5-6, or to perform other types of operations.

Figure 3:
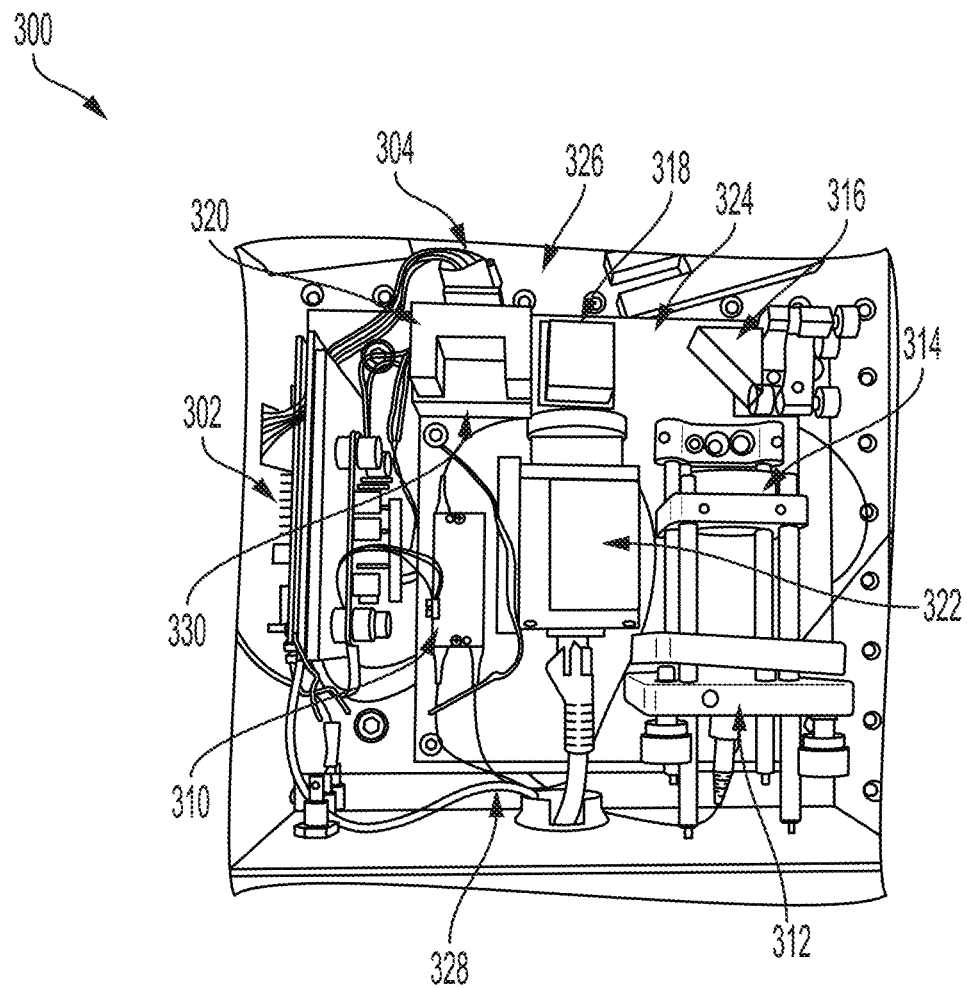
FIG. 3 shows a top-view photograph of a prototype system for wavelength measurement.

FIG. 3 presents a top-view photograph of a prototype system 300 for wavelength measurement. In some instances, the prototype system 300 shown in FIG. 3 may be used for performing a wavelength measurement, e.g., the processes described in relation to FIGS. 5 and 6. In the example shown in FIG. 3, the prototype system 300 includes control electronics 302, environmental sensors 304, and a series of optical elements that defines one or more beam paths between a laser source (not shown) and a camera 322. In the example shown, the series of optical elements includes a MEMS optical fiber switch 310, a fiber coupler 312, a collimating lens 314, a mirror 316, a beam splitter 318, and dual Fizeau interferometers 320. The prototype system 300 may also include a beam stop, which can be the cover (not shown) of the prototype system. In some examples, the prototype system 300 may receive laser beams through optical fibers 328 optically coupled to the MEMS optical fiber switch 310. The laser beams may be generated by the laser sources (not shown). As shown in FIG. 3, a physical footprint of the prototype system 300 is approximately 175 mm×175 mm×100 mm (L×W×H). However, other dimensions are possible.

In some implementations, the series of optical elements are mounted on a base unit 324, which is further mounted on an optical table 326. In these implementations, the control electronics 302 may be located elsewhere (e.g., remotely or not on the base unit 324). In some implementations, a temperature of the base unit 324 may be actively stabilized using a low-power (<1 W) temperature controller (not shown). In some instances, the low-power temperature controller is used to limit a variation in the temperature of the base unit 324 to ±20 mK. In some implementations, the environmental sensors 304 have low power consumption during operation, e.g., about 3 mW. In some implementations, the technique and system disclosed herein are suitable for portable devices where power consumption is a key design constraint.

In the prototype system 300, the dual Fizeau interferometers 320 in a monolithic block 330 are further mounted on the base unit 324 with the low-power temperature controller. In some implementations, a thermal effect to the monolithic block 330 may simultaneously affect geometries of the dual Fizeau interferometers 320. In some instances, the thermal effect to the geometries of the dual Fizeau interferometers 320 may affect interferograms collected on the camera 322, which are used to determine the wavelength of the test laser beam. In some examples, changes in the geometries of the dual Fizeau interferometers 320 may be determined by monitoring the temperature of the interferometers. The temperature readings can be used to correct the wavelength reading.

In the prototype system 300 shown in FIG. 3, the environmental sensors 304 are obtained from Honeywell (BME280); the MEMS optical fiber switch 310 with custom connectors is obtained from Thorlabs (OSW12-830-SM); the camera 322 is obtained from IDS systems (UI-5290SE); and the temperature controller is obtained from Koheron (TEC100L).

Figure 4A:
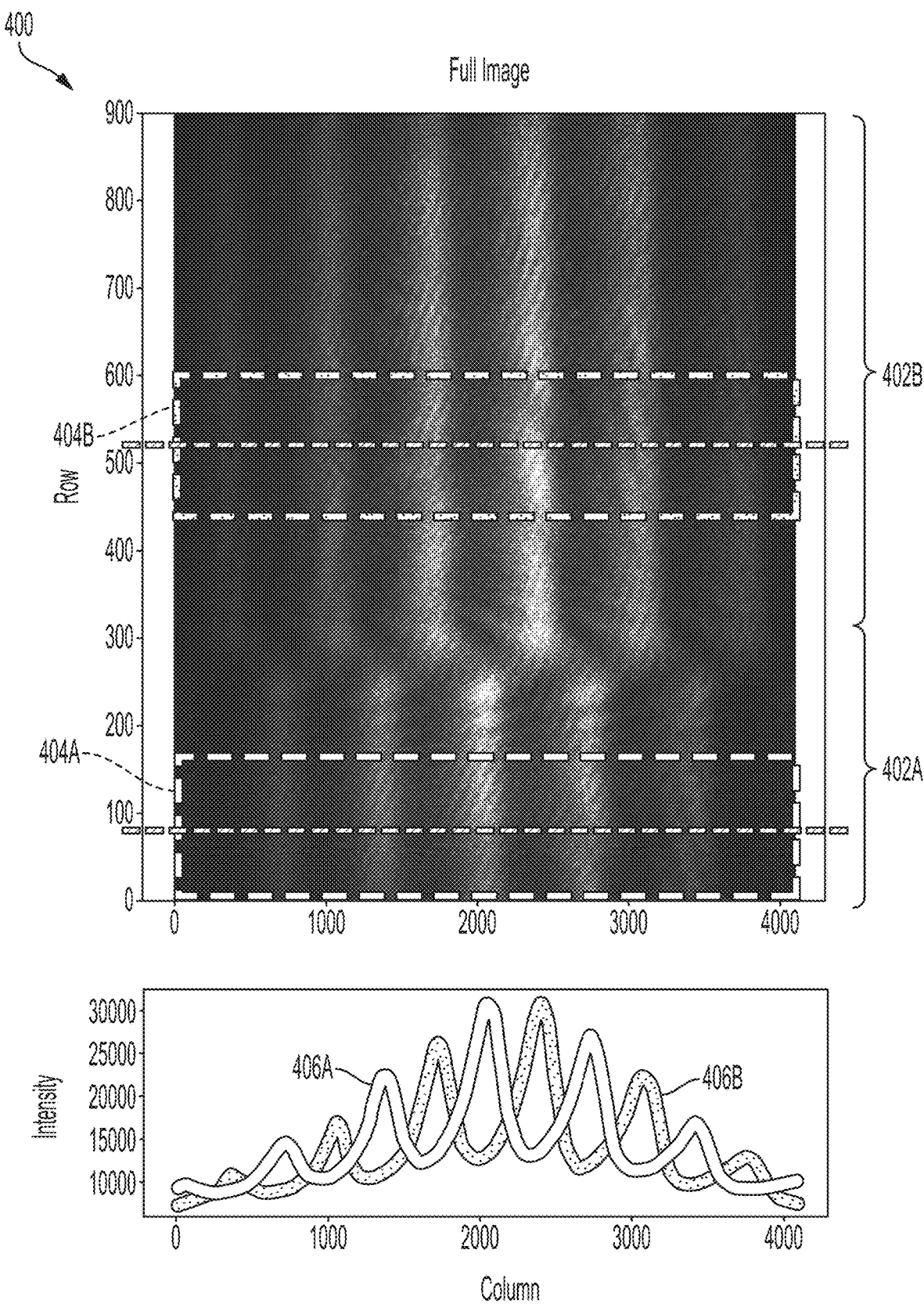
FIG. 4A shows example interferogram data generated by a camera in a prototype system.

FIG. 4A presents a plot 400 showing example interferogram data. As shown in FIG. 4A, the example interferogram data is produced using a wavelength measurement system, e.g., the system 200, 300 shown in FIGS. 2-3. In some instances, two interferograms 402A, 402B from two interferometer cavities (e.g., the interferometer cavities 242A, 242B shown in FIG. 2) in the full spatial intensity profile are spatially separated and captured by a camera (e.g., the camera system 228, 322 as shown in FIGS. 2-3). In some implementations, the camera may include a 2-dimensional (2D) array of image sensors, each of which may be a Charge Coupled Device (CCD) sensor and a complementary metal-oxide semiconductor (CMOS) sensor. For example, a first interferogram 402A may be captured by first rows of pixels (e.g., between row 0 and row 180) of the camera and a second interferogram 402B may be captured by second rows of pixels (between row 420 and row 600) of the camera. In some instances, a subset of rows in each of the interferograms is used for determining interference fringes of the corresponding interferograms. As shown in FIG. 4A, a summation of intensity values at pixels in the same column of a first subset of rows 404A (e.g., between row 0 and row 180) is used to determine a first intensity curve 406A of the first interferogram 402A. Similarly, a summation of intensity values at pixels in the same column of a second subset of rows 404B (e.g., between row 420 and row 600) is used to determine a second intensity curve 406B of the second interferogram 402B. In some instances, the camera may include two line-sensor arrays oriented in the same direction and separated by a distance so as to capture the two spatially separated interferograms 402A, 402B.

Figure 4B:
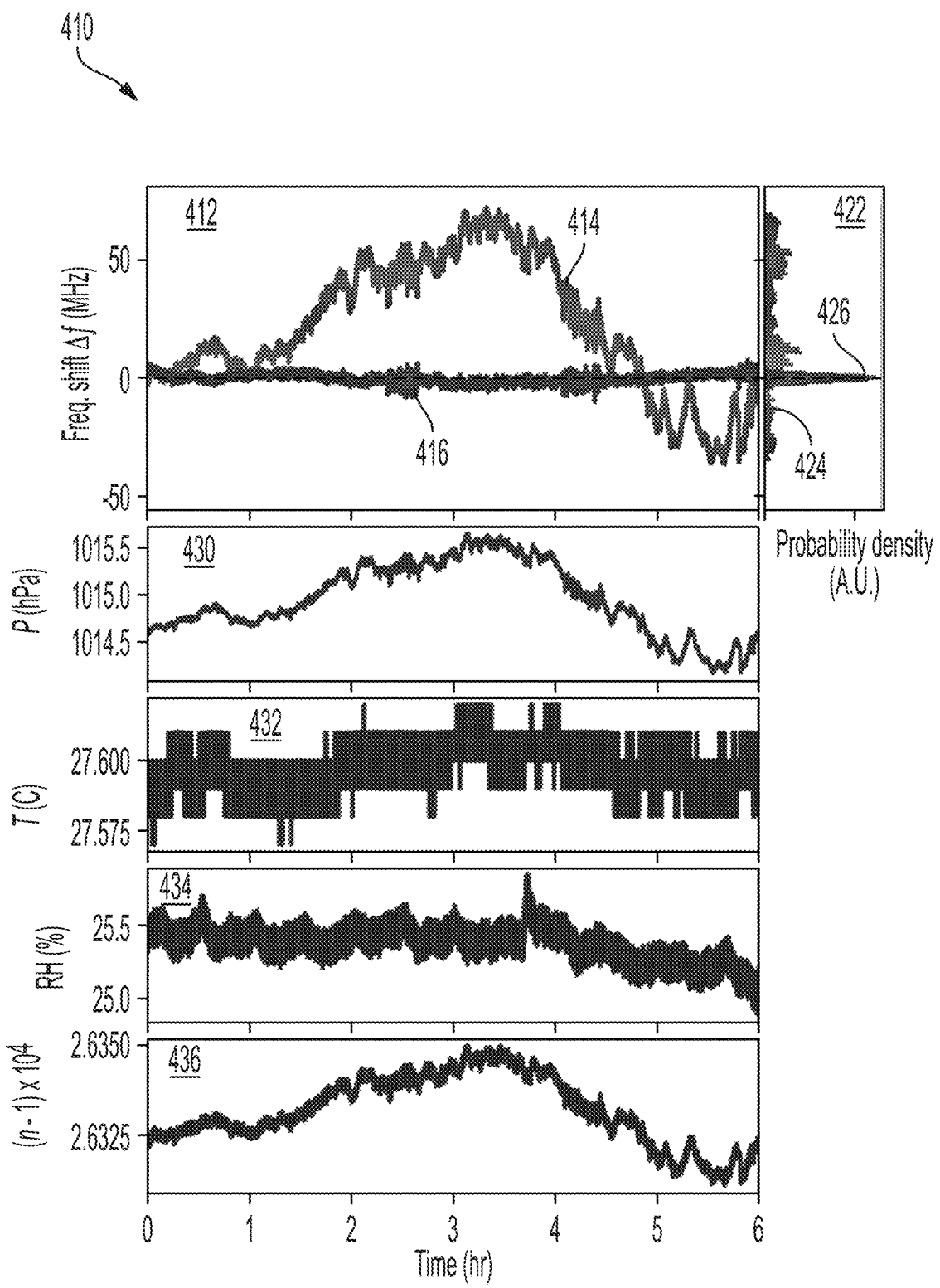
FIG. 4B is a plot showing measured frequencies before and after compensation for environmental influences.

FIG. 4B presents a plot 410 showing measured frequencies before and after compensation for environmental influences. As shown in FIG. 4, frequency measurements are performed using a wavelength measurement system, e.g., the prototype system 300 shown in FIG. 3. As shown in FIG. 4, the plot 410 contains six panels, including a first panel 412 showing frequency shift values ($\Delta f$) over a time period (6 hours), a second panel 422 showing probability densities over a range of the frequency shift values ($\Delta f$), a third panel 430 showing pressure values over the same time period, a fourth panel 432 showing temperature values over the same time period, a fifth panel 434 showing relative humidity over the same time period, and a sixth panel 436 showing calculated refractive index according to the measured environmental parameters shown in the third, fourth and fifth panels 430, 432, and 434. The plot 410 may be obtained by performing a wavelength measurement process, e.g., the example process 600 described in FIG. 6.

In some instances, a laser source is used to provide a laser beam with a wavelength of 1018.62 nm and an optical frequency of 294.52 THz to an optical system through optical fibers, e.g., the optical fibers 328 of FIG. 3. The laser source is stabilized over the entire measurement period and locked to an ultra-stable optical cavity, with a wavelength variation less 0.2 fm, e.g., equivalent to a frequency variation less than 100 kHz, which is much less than the measurement precision that can be provided by the prototype system 300.

In some instances, the curve 414 in the first panel 412 of FIG. 4 shows the frequency shift ($\Delta f$) before compensation for the environmental influences on the refractive index. In some instances, the refractive index of the air at the wavelength of the laser beam of 1018.62 nm is fixed at a value determined by the initial environmental conditions. As shown in the curve 414 and corresponding histogram 424, the frequency shift ($\Delta f$) values before compensation vary widely between +70 MHz and −35 MHz.

In some implementations, the compensation is performed based on data of environmental parameters collected by environmental sensors during the same period of time as shown in subpanels 430, 432 and 434. As shown in the third subpanel 430, the pressure increases from 1014.5 to 1015.5 hPa during the time period between hour 1 and hour 3 and reduces between hour 3 and hour 5 and eventually to a value below 1014.5 hPa at hour 5. The temperature and relative humidity remain constant with visible fluctuations and random noise in the signal as shown in the fourth and fifth subpanels 432, 434.

The data of the environmental parameters is used to correct the refractive index value. The calculated refractive index value as a function of time (shown in the sixth subpanel 436) exhibits a similar shape with a generally consistent behavior over time as the pressure shown in the third subpanel 430. As shown in curve 416 in the first panel 412 of FIG. 4, after correcting the refractive index, the frequency shift ($\Delta f$) values are reduced to a range between −5 MHz and +5 MHz with a standard deviation of <2 MHz. As shown in a corresponding histogram 426 in the second panel 424 of FIG. 4, the probability density of the frequency shift ($\Delta f$) values after the compensation exhibits an approximate Gaussian nature with a bandwidth of <2 MHz, which is equivalent to a variation of 6 parts in $10^9$ of the frequency. In some implementations, the methods and techniques presented here can effectively remove the environmental influences on the wavelength measurement without conducting a recalibration process.

FIG. 5 presents a flow chart showing an example process 500 for calibrating a wavelength measurement system. The example process 500 can be performed, for example, by a wavelength measurement system and reference laser with a known frequency. For instance, operations in the process 500 may be performed or implemented using the components in the wavelength measurement systems 100, 200, and 300 shown in FIGS. 1-3, or another type of system. The example process 500 may include additional or different operations, including operations performed by additional or different components, and the operations may be performed in the order shown or in another order.

In some implementations, the example process 500 may be performed during initial setup of a wavelength measurement system. In some implementations, the process 500 may be performed for re-calibration purposes when a substantial reconfiguration to the wavelength measurement system is made, e.g., after an optical re-alignment. In some implementations, the example process 500 may be used to determine at least one interferometer length of at least one interferometer of the wavelength measurement system. The example process 500 may also be used to determine Gaussian envelope parameters or another parameter. In some examples, the at least one interferometer length and the Gaussian envelope parameters may be used in a wavelength measurement process (e.g., the process 600 described in relation to FIG. 6) to determine a wavelength of a test laser beam.

At 502, information of a reference laser beam is provided. In some implementations, the information including, for example, a wavelength, a frequency or other parameters of the reference laser beam, may be provided by inputting the information into a control system. For example, the information with a high accuracy and precision may be input to the control system through an input device and stored in a memory of the control system. In some instances, the wavelength of the reference laser beam may be provided by the manufacturer, determined by a theoretical calculation or in another manner. In some implementations, the reference laser beam may be only used at 502 of the example process 500. The techniques and systems disclosed here do not require a permanent reference laser for intermittent re-calibration to compensate for the long-term drift. In some instances, multiple reference laser beams with different frequencies may be used.

At 504, approximate interferometer lengths are measured. In some implementations, the approximate interferometer lengths of an interferometer may be measured using a mechanical method, e.g., a micrometer gauge. In some examples, the micrometer can provide an accuracy of ±10 micrometers (μm). In some examples, the interferometer is implemented as the dual Fizeau interferometers 226 shown in FIG. 2 or in another manner. In some instances, the approximate interferometer lengths may be measured at two opposing ends of the dual Fizeau interferometers 226 or anywhere along the interferometer cavities. In some instances, the difference between the interferometer lengths measured at the two opposing ends which is less than 10 micrometers is caused by the angled second glass piece 240B. In some implementations, the interferometer lengths measured here are used as a reference value to constrain fitted values in the example process 500. In some instances, the step 244 has a height of 390 μm.

At 506, data from an optical system and environmental sensors is received. The optical system may include a camera (or camera system) and two lasers configured to generate respective laser beams. In some implementations, the camera may be configured at an output of a beam splitter (e.g., as shown in FIGS. 2 and 3), which combines the two laser beams creating one or more interferograms. In some implementations, the data produced by the camera upon detecting the one or more interferograms includes interferogram data. In some examples, the environmental sensors are configured in proximity to the interferometer to measure environmental parameters in cavities of the interferometer. In some instances, the environmental sensors may be implemented as the environmental sensors as shown in FIGS. 2 and 3 or in another manner. In some examples, data received from the environmental sensors may include sensor data representing values of the environmental parameters in the transmission medium, including at least one of a temperature, a pressure, a humidity, and a $CO_2$ concentration level. In some implementations, the sensor data is received by the control system and stored in the memory, which may be implemented as the control system 202, 302 as shown in FIGS. 2 and 3 or in another manner.

At 508, a refractive index of the transmission medium in the interferometer is computed. In some implementations, the sensor data received from the environmental sensors may be used to determine the refractive index of the transmission medium (e.g., air) in the cavities of the interferometer. In some instances, the refractive index may be a function of the temperature, pressure, humidity, and wavelength of the reference laser beam. In some instances, the refractive index may be also a function of the $CO_2$ concentration level in the transmission medium. In some implementations, the refractive index is determined by the control system according to a refractive index calculation algorithm. In some examples, the refractive index calculation algorithm may be performed by executing programs stored in the memory of the control system. In some instances, the refractive index may be used to determine an optical path length, which is a product of the interferometer length and the refractive index.

At 510, the interferometer lengths are fitted. In some implementations, the interferometer lengths are determined by fitting a reflected intensity model to the interferogram data received by the camera. For example, the reflected intensity model may be implemented as the reflected intensity model 700A-700C described in relation to FIGS. 7A-7C or in another manner. In some instances, the interferogram data may include parameters such as a phase difference, and a reflected electric field amplitude for the reflected laser beam at internal surfaces of the interferometer (e.g., the zeroth, first and second order reflections described in relation to FIGS. 7A-7C). The geometric parameters of the reflected intensity model may be determined using the known wavelength of the reference laser beam and the sensor data received from the environmental sensors. In some implementations, the fitted interferometer lengths are compared to the measured interferometer lengths at 504. In some implementations, the interferometer lengths are fitted with a least-squares minimization algorithm. In some examples, the least-square minimization algorithm may use a minimum chi-square method by minimizing a Chi-square function.

At 512, Gaussian envelope parameters of the reference laser beam are fitted. In some implementations, the Gaussian envelope parameters may be determined by fitting the reflected intensity model to the interferogram data received from the camera. For example, the Gaussian envelope parameters may be determined according to the refractive index, the fitted interferometer lengths, and the wavelength of the reference laser beam.

FIG. 6 presents a flow chart showing an example process 600 for performing a wavelength measurement. The example process 600 can be performed, for example, by a wavelength measurement system. For instance, operations in the example process 600 may be performed or implemented using the components in the wavelength measurement systems 100, 200, and 300 shown in FIGS. 1-3, or another type of system. The example process 600 may include additional or different operations, including operations performed by additional or different components, and the operations may be performed in the order shown or in another order.

In some implementations, the example process 600 is performed after a calibration process. In some instances, the calibration process may be implemented as the example process 500 described in relation to FIG. 5 or in another manner. In some implementations, prior to performing the example process 600, a test laser beam may be directed to the wavelength measurement system (e.g., the wavelength measurement system 200, 300 as described in relation to FIGS. 2 and 3, respectively).

At 602, data from the optical system and environmental sensors is received. In some implementations, the optical system and the environmental sensors may be configured as shown in FIGS. 2 and 3 or in another manner. In some examples, operation 602 may be implemented as operation 506 in FIG. 5 or in another manner.

At 604, a refractive index of a transmission medium in an interferometer is computed. In some examples, operation 604 may be implemented as operation 508 in FIG. 5 or in another manner. In some instances, the refractive index may be determined using an initial guess value of a wavelength of the test laser beam. In some implementations, the initial guess value of the wavelength of the test laser beam may be inferred from the number of fringes in the interferogram data received from a camera system of the optical system, may be obtained from a previous measurement result or in another manner.

At 606, a first value of the wavelength of the test laser beam is determined using a local optimization model. In some implementations, the interferogram data received from the camera system is fitted according to a reflected intensity model, such as the reflected intensity model 700A-700C described in relation to FIGS. 7A-7C. A reflected intensity model may be represented by a function, $f$, that is based on multiple variables, as shown below:

$$f(y, \lambda, T, P, H, C_{CO_2}, \alpha, e_1, y_{c1}, \sigma_1, O_1, e_2, y_{c2}, \sigma_2, O_2). \quad (1)$$

In Equation (1), y is the y-axis position or pixel position on the camera or linear array, $\lambda$ is the wavelength, T is the temperature, P is the pressure, H is the humidity, $C_{CO_2}$ is the $CO_2$ concentration, a is the wedge angle, $e_1$ is the first interferometer length, $(y_{c1}, \sigma_1, O_1)$ are first Gaussian envelope parameters of a first interferometer cavity, $e_2$ is the second interferometer length, and $(y_{c2}, \sigma_2, O_2)$ are second Gaussian envelope parameters of a second interferometer cavity. In some implementations, the wedge angle $\alpha$, which is common to both interferometers in the dual Fizeau interferometers 226 as shown in FIG. 2, may be determined using a mechanical measurement method. In some instances, the interferometer lengths and Gaussian envelope parameters are determined during a calibration process described in relation to FIG. 5, or in another manner. In some instances, the environmental parameters T, P, RH and $C_{CO_2}$ are determined according to the data from the environmental sensors.

In some implementations, the local optimization mode may be based on a least-squares minimization algorithm. In some examples, the least-square minimization algorithm may use a minimum chi-square method by minimizing a Chi-square function locally, which is defined as $$\chi^2 = \sum_i (f(y_i, \lambda) - D_i)^2, \quad (2)$$

where $f(y_i, \lambda)$ is the reflected intensity model at a y-axis position and a wavelength and $D_i$ is actual intensity in the interferograms captured by the camera at the same y-axis position. Equation (2) is used to fit the wavelength using information from both interferometers with all other parameters fixed. In some instances, since the actual intensities in the interferograms are periodic with respect to integer multiples of the wavelength, the chi-square value $(\chi^2)$ is also periodic with respect to integer multiples of the wavelength with multiple local minima separated in wavelength by the cavity-free spectral range. In some instances, the cavity-free spectral range is a spacing in terms of wavelength or optical frequency between successive minima in the interferogram. In some instances, the cavity-free spectral range is a function of the speed of light and the interferometer length. In some instances, the first value of the wavelength is the wavelength value at a local minimum of the chi-square value.

At 608, a second value of the wavelength of the test laser beam is determined using a global optimization model. In some instances, the second value of the wavelength is the wavelength value at the global minimum of the chi-square value. In some instances, the global optimization model is used to determine the global minimum using the local minimum and the cavity-free spectral range separating adjacent local minima. In some instances, by varying the wavelength according to the cavity-free spectral range, the method allows a "hopping" between local minima to further reduce the chi-square value in order to efficiently search for the global minimum. In some instances, the global optimization model can provide a fast, accurate, and reliable approach to determine the true value of the wavelength. In some implementations, the dual Fizeau interferometers with two different interferometer lengths may provide reliable and efficient fitting of the wavelengths. For example, local minima corresponding to the two different interferometer lengths are separated by integers of the cavity free-spectral-range. In some implementations, the minimum chi-square method may be performed on two interferograms created from the two corresponding interferometer cavities. In some implementations, the second value of the wavelength obtained during operation 608 may be further used in operation 606 to allow fine-tuning the fitting of the true wavelength of the test laser beam. In some implementations, other methods for fitting the local or global optimization models may be used.

In some implementations, the sensor data can be used along with a thermal expansion model to correct for the thermal expansion of the glass pieces of the interferometer. In some instances, the thermal expansion model may be determined according to the interferometer structure and geometry. In some instances, the thermal expansion model is a linear function of the temperature and can be determined using a laser with a known wavelength. In some instances, the thermal expansion effect is determined prior to the wavelength measurement as shown in FIG. 6.

It will be appreciated that a model (e.g., a reflective intensity model) may be used to represent the optical characteristics of an interferometer. The model may be based on a configuration of the interferometer and may also be used to fit data generated by light traversing the interferometer. Examples of interferometers with distinct configurations include a Michelson interferometer, a Fabry-Perot interferometer, a Twyman-Green interferometer, a Mach-Zehnder, a Sagnac interferometer, and a Fizeau interferometer. Other types of interferometers are possible. The model may serve as part of a process to determine a property of the light (e.g., a wavelength of the light), such as the models described in relation to the example processes 500, 600 of respective FIGS. 5 and 6.

Figure 7A:
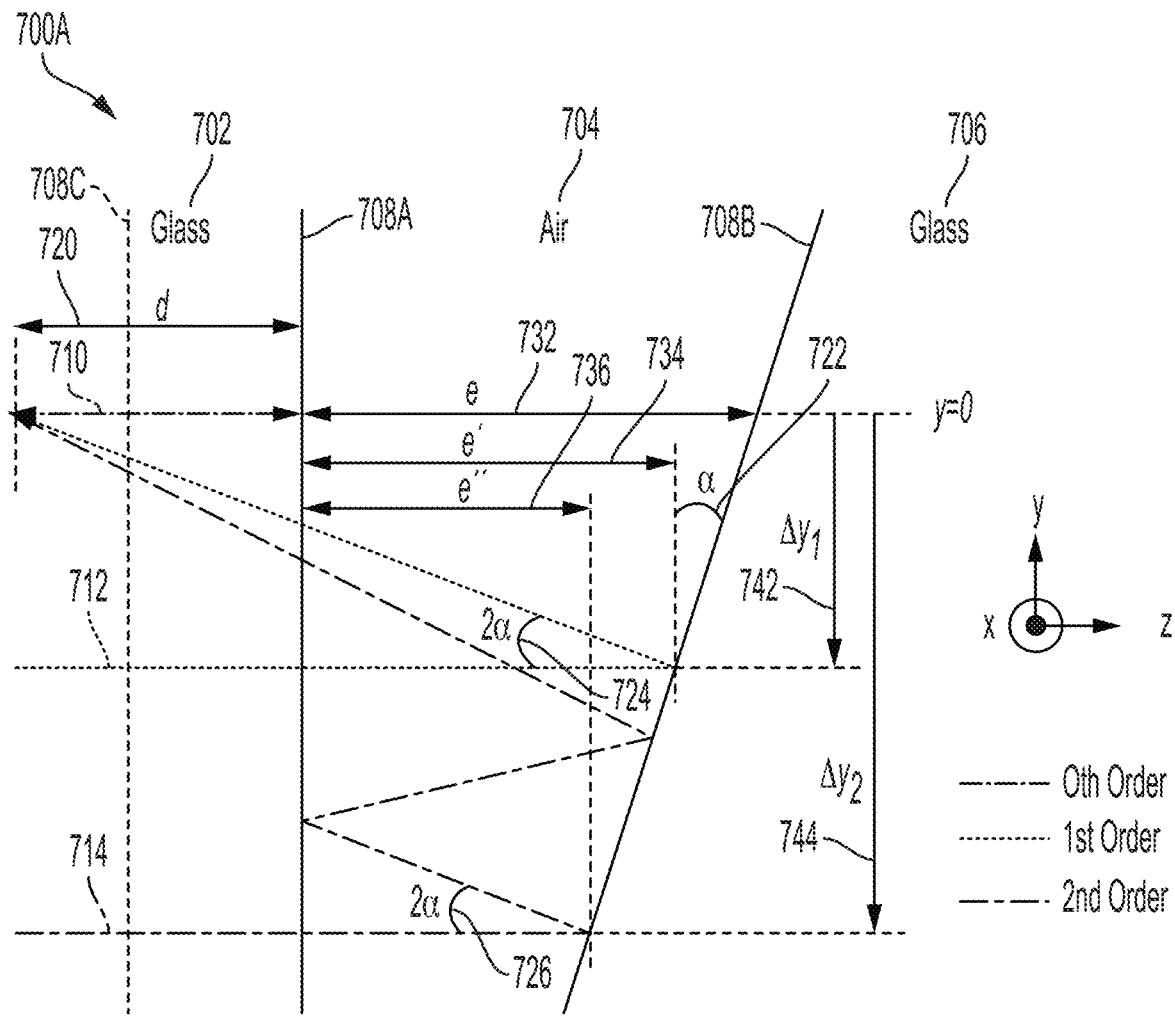
FIGS. 7A-7C are schematic diagrams of a reflected intensity model used in the example processes of respective FIGS. 5 and 6.
Figure 7B:
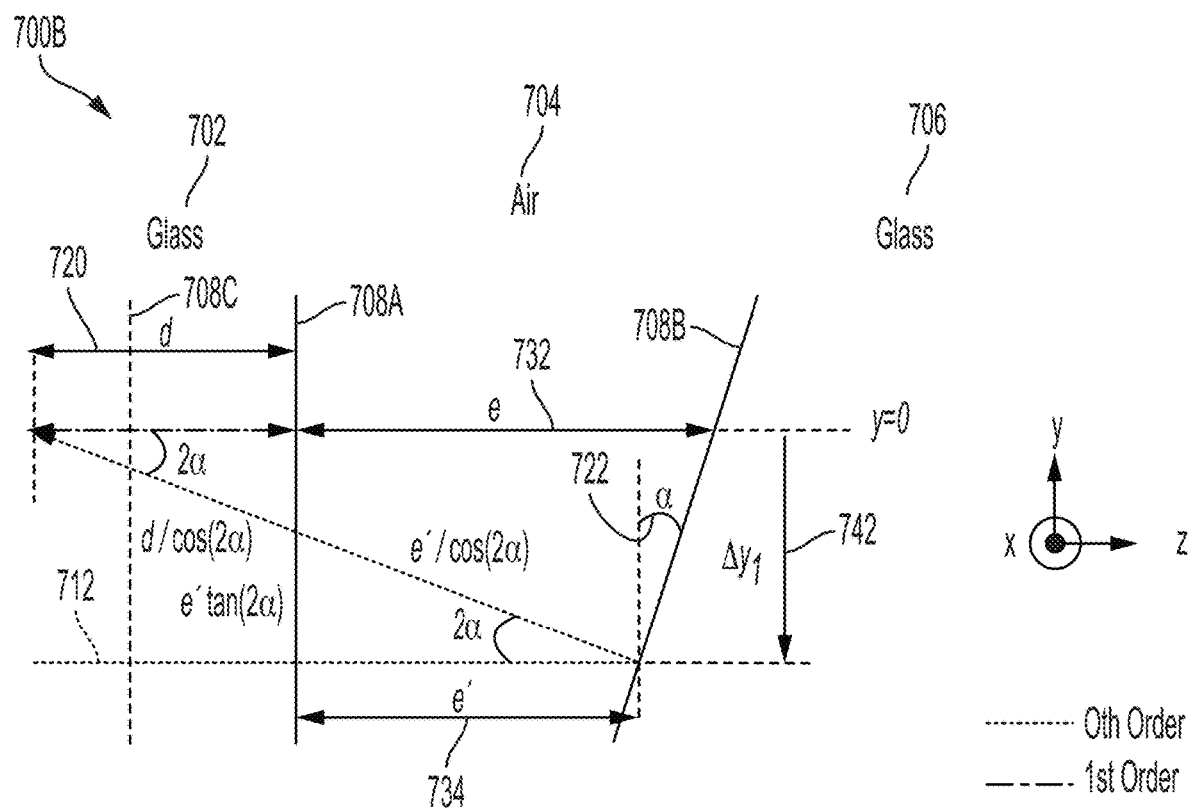
Figure 7C:
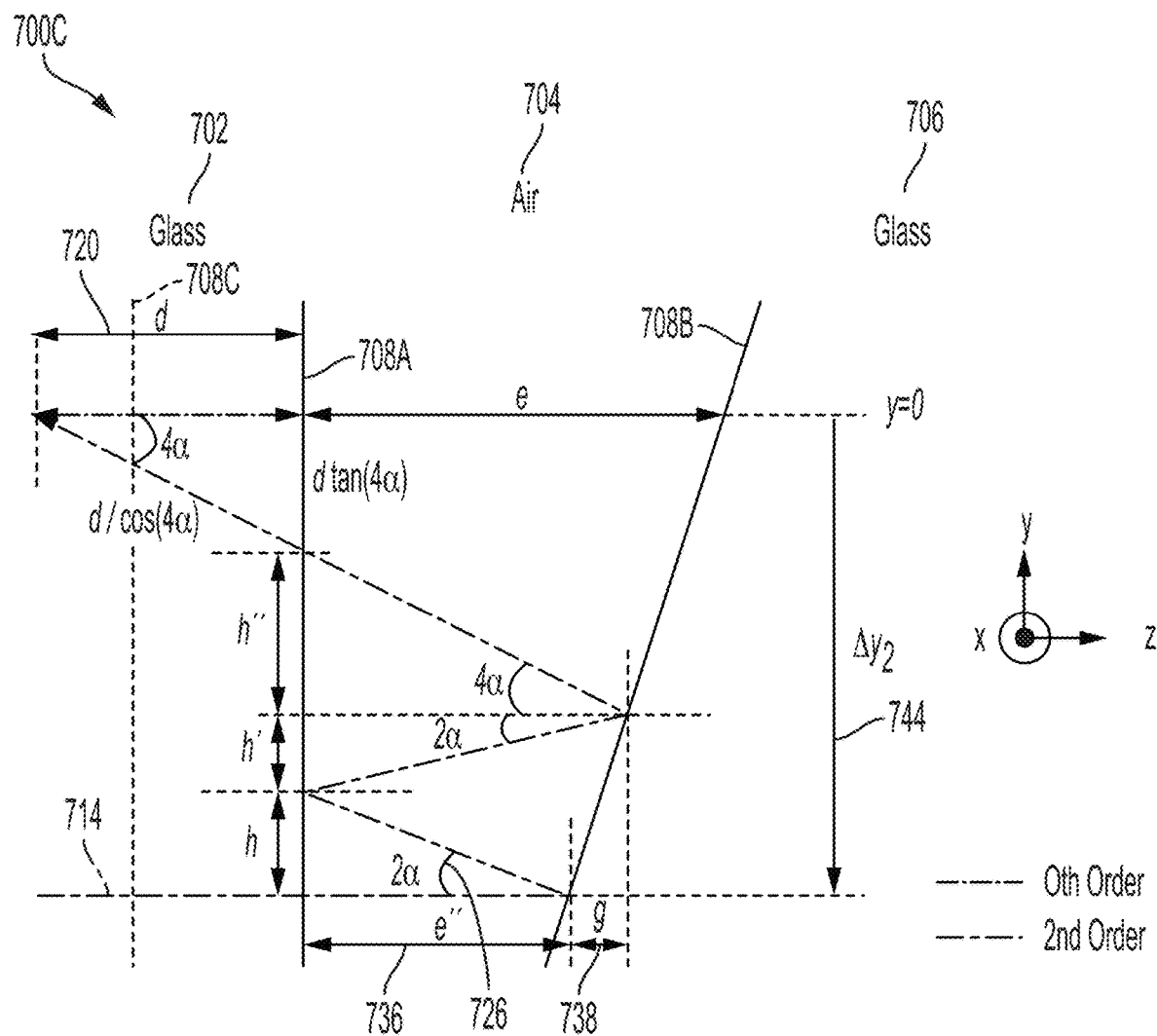

FIGS. 7A-7C present schematic diagrams 700A-700C of an example reflected intensity model for a Fizeau interferometer. In some instances, the reflected intensity model in FIGS. 7A-7C is used for wavelength measurement using a wavelength measurement system as shown in FIGS. 1-3. In some instances, a different reflected intensity model may be constructed based on ray optics when a different wavelength measurement system is used, for example when using a different interferometer such as Michelson interferometers, or Fabry-Perot interferometers. In each of the FIGS. 7A-7C, the schematic diagrams 700A-700C include reference axes defined by an x axis, ay axis and a z axis. The x axis is perpendicular to the schematic diagrams, with a positive direction extending into the schematic diagrams. They and z axes define a plane parallel to the schematic diagrams of FIGS. 7A-7C. In the example shown in FIGS. 7A-7C, three rays 710, 712, 714 corresponding to the zeroth, first and second order reflections at two internal air/glass interfaces in an interferometer are evaluated for purposes of illustration. All other rays with higher order reflections may be determined in the same manner or in a different manner. In some implementations, a similar analysis may be applied on the dual Fizeau interferometers with different interferometer lengths. In some implementations, parameters, such as a path length, a phase difference, and a reflected electric field amplitude of each of the three rays can be determined according to the schematic ray diagram. More elaborate models based on wave optics can also be used to model the interferometer.

In the example shown in FIG. 7A, a ray picture is used to describe a specific example. The interferometer in the example is a Fizeau interferometer such as that shown in FIG. 3, where a first internal surface 708A and a second internal surface 708B are coated with Inconel to yield a reflectivity at each surface of 33%. A first external surface 708C has a broadband dielectric coating to minimize reflections. The reflectivity of the first external surface of the interferometer 320 shown in FIG. 3 is less than 0.5% in a wavelength range between 800 and 1100 nm. All the three rays 710, 712, 714 are received by a detector, e.g., the camera system 228 in the wavelength measurement system 200, relative to the first internal surface 708A of the interferometer, to create an interferogram. In some implementations, the detector may be located on a detector plane, which is separated from the first internal surface 708A of the interferometer by a distance, d, 720. In some instances, the distance, d, 720 may include the thickness of a first glass piece, the beam splitter and the thickness of a transmission medium between the detector and the first glass piece. The distance d can be characterized as a physical distance with a path dependent index of refraction. The example derivation assumes that the index of refraction of the gap 704 and d 720 is air. When a 722 is small and d 720 is large the outgoing rays are nearly parallel, and d only leads to small relative phase shifts between the different beams. In general, an infinite number of rays such as 710, 712 and 714 contribute to the interferogram. In many cases, a finite number of rays are sufficient to describe the interferogram. Since each reflection results in some loss the contribution of each ray decreases with the number of reflections.

In some implementations, evaluations of the reflections of the rays may be simplified according to certain assumptions. For example, a reflection loss at the first external surface 708C may be ignored by depositing an antireflection coating. In some examples, these assumptions may lead to a small shifts in quantities such as the optical path length differences of the laser beams used to calculate the interferogram. For example, the first glass piece adds a nearly constant phase difference to all the reflected laser beams, which acts as an offset to the value of d 720 used.

In some implementations, an incoming laser beam may be a plane wave, traveling in the direction and the three rays 710, 712, 714 may have no initial phase difference before reaching the first internal surface 708A. In some examples, the first internal surface 708A is located on the x-y plane and the second internal surface 708B is angled in the x-y plane at a wedge angle α 722 to the $\vec{y}$ axis.

In the example shown in FIG. 7A, a reflectivity of the first and second internal surfaces 708A, 708B is expressed as $$R=(n(\lambda)^2-n_{air}(\lambda,T,P,RH,C_{CO_2}))/(n(\lambda)^2+n_{air}(\lambda,T,P,RH,C_{CO_2})), \quad (3)$$

where R is the reflectivity at the interface, n is the wavelength-dependent refractive index of the mirrors, $n_{air}$ ($\lambda$, T, P, RH, $C_{CO_2}$) is the environmentally dependent index of refraction of the air in the gap between the interferometer mirrors, and $\lambda$ is the wavelength. In some examples, an electric field reflection coefficient, r, is defined by r=$\sqrt{R}$, and corresponding transmission coefficient, t, is defined by t=1−r.

In some implementations, a path length of the first ray 710 corresponding to the zeroth order reflection from the first internal surface 708A is equal to the distance d 720 and the reflected electric field of the first ray 710 is expressed as:

$$E_0 = rE_{in} \cdot \exp\left(\frac{i2\pi nf}{c}d\right), \quad (4)$$

where $E_0$ is the reflected electric field of the zeroth order reflection (e.g., the first ray 710), $E_{in}$ is the incident electric field, $f$ is the optical frequency, n is the index of refraction of the medium d assumed to be the same as that between the reflective surfaces of the interferometer and c is the speed of light.

According to the example diagram 700B of the second ray 712 shown in FIG. 7B, a distance e' 734 along the $\vec{z}$ axis between the first internal surface 708A and a point where the second ray 712 reflects on the second internal surface 708B may be expressed as:

$$e' = e - \Delta y_1 \tan(\alpha) = \frac{e - d\tan(\alpha)\tan(2\alpha)}{1 + \tan(\alpha)\tan(2\alpha)}. \quad (5)$$

A distance $\Delta y_1$ 742 along the $\vec{y}$ axis corresponding to the point where second ray 712 reflects on the second internal surface 708B in order to interfere with the first ray 710 at a point on the camera may be expressed as:

$$\Delta y_1 = (d + e')\tan(2\alpha) = (d + e)\frac{\tan(2\alpha)}{1 + \tan(\alpha)\tan(2\alpha)}. \quad (6)$$

In the example shown in FIG. 7B, the total path length $l_1$ for the second ray 712 may be determined as:

$$\ell_1 = e' + \frac{d + e'}{\cos(2\alpha)}. \quad (7)$$

Note that e' can be written in terms of e, the spacing between the reflective surfaces of the Fizeau interferometer at the point of incidence of the second ray 712, α and d using Equation (5).

The reflected electric field $E_1$ of the second ray 712 may be determined as:

$$E_1 = rt^2 E_{in} \cdot \exp\left(\frac{i2\pi n f}{c}\ell_1 + \pi\right), \quad (8)$$

where $E_1$ is the reflected electric field of the first order reflection (e.g., the second ray 712), and an extra π phase difference is introduced to the second ray 712 as a result of the single internal reflection at the second internal surface 708B, assumed to be an interface where the ray is incident from the side of lower index of refraction, leading to a π phase shift of the ray as it is reflected. The assumption is consistent with 704 as an air gap and the first and second glass pieces 702, 706 with Inconel-coated surfaces (e.g., the first and second internal surfaces 708A, 708B), having greater index of refraction than the air.

According to the example ray diagram of the third ray 714 shown in FIG. 7C, a distance e" 736 along the $\vec{z}$ axis between the first internal surface 708A and a first point where the third ray 714 reflects on the second internal surface 708B may be expressed as:

$$e'' = e - \Delta y_2 \tan(\alpha), \quad (9)$$

where a distance $\Delta y_2$ 744 along the $\vec{y}$ axis may be expressed as:

$$\Delta y_2 = h + h' + h'' + d\tan(4\alpha), \quad (10)$$

where $\Delta y_2$ can be rewritten as, $$\Delta y_2 = e'' \tan(2\alpha) + (e'' + g)\tan(2\alpha) + (e'' + g)\tan(4\alpha) + d \tan(4\alpha). \quad (11)$$

Here, g 738 is the distance traversed along the $\vec{z}$ axis between the first reflection point and a second reflection point on surface 708B of the third ray 714 that combines with the first and second rays 710, 712.

Defining z=0 to be at the first internal surface 708A, and using the following equations:

$$y = h - \Delta y_2 + z\tan(2\alpha), \quad (12)$$

$$z = e'' + g = \quad (13)$$

$$e'' + (y + \Delta y_2)\tan(\alpha) = \frac{h\tan(\alpha) + e''}{1 - \tan(\alpha)\tan(2\alpha)} = \frac{e''\left(1 + \frac{\tan(\alpha)}{\cos(\alpha)}\right)}{1 - \tan(\alpha)\tan(2\alpha)},$$

$$\Delta y_2 = d\tan(4\alpha) + Ce'', \quad (14)$$

$$\Delta y_2 = d\tan(4\alpha) + C(e - \Delta y_2 \tan(\alpha)), \quad (15)$$

$$\Delta y_2 = \frac{d\tan(4\alpha) + Ce}{1 + C\tan(\alpha)}, \quad (16)$$

and $$C = \tan(2\alpha) + \frac{(\tan(4\alpha) + \tan(2\alpha)) \cdot \left(1 + \frac{\tan(\alpha)}{\cos(2\alpha)}\right)}{1 - \tan(\alpha)\tan(2\alpha)}, \quad (17)$$

the total path length $l_2$ of the third ray 714 may be determined as:

$$\ell_2 = e'' + \frac{e''}{\cos(2\alpha)} + \frac{e'' + g}{\cos(2\alpha)} + \frac{e'' + g}{\cos(4\alpha)} + \frac{d}{\cos(4\alpha)}. \quad (18)$$

Note that the total path length $l_2$ can also be written in terms of e, α and d using Equations (9), (13), and (16). The field $E_2$ of the second order reflection (e.g., the third ray 714) is:

$$E_2 = r^3 t^2 E_{in} \cdot \exp\left(\frac{i2\pi n f}{c}\ell_2 + 3\pi\right), \quad (19)$$

where an extra 3π phase difference is introduced to the third ray 714 as a result of the triple internal reflection at the first and second internal surfaces 708A, 708B.

In some implementations, an interferogram may be determined as, $$I_R = |E_0 + E_1 + E_2|^2, \quad (20)$$

where $I_R$ can be expressed in terms of e, d, α, n, and λ or f. In some instances, λ can be determined by the geometry of the interferometer (e.g., e, d, and α) and the index of refraction n using the reflected intensity, $I_R$.

In some implementations, a total reflected intensity across the entire beam may be determined by replacing e in the above equations with e+y tan(α), where y is an array of points representing each pixel in the detector, and multiplying the whole array by a Gaussian envelope function, $$I_{detected}(y) = I_R(y) \cdot \exp\left(-\frac{(y - y_c)^2}{2\sigma^2}\right) + O, \quad (21)$$

where $y_c$, σ and O are Gaussian envelope parameters. For example, $y_c$, σ and O are respectively, the center, 1/e width and offset (background level) of the Gaussian signal that is detected on the detector.

Although FIGS. 7A-7C are presented in the context of a Fizeau interferometer, it will be understood that other types of interferometers may serve as a basis for determining a reflective intensity model. For example, a Michelson interferometer, a Fabry-Perot interferometer, a Twyman-Green interferometer, a Mach-Zehnder, a Sagnac interferometer, a Fizeau interferometer, or some other type of interferometer may serve as a basis for generating the reflective intensity model. Moreover, methods other than optical ray analysis may be used to develop the reflective intensity model.

In a first example, a wavelength measurement system includes an interferometer, a camera system, a sensor and a control system. The interferometer includes two reflective surfaces and a transmission medium between the two reflective surfaces. The interferometer is configured to receive an optical signal from a laser and produce an interferogram in response. The camera system is configured to receive the interferogram from the interferometer and generate interferogram data in response. The interferogram data represents the interferogram received from the interferometer. The sensor is configured to sense an environmental parameter of the transmission medium and generate sensor data in response. The sensor data represents a value of the environmental parameter. The control system is configured to perform operations including, receiving the interferogram data from the camera system and the sensor data from the sensor; and computing a wavelength of the laser based on the interferogram data and the sensor data.

Implementations of the first example may include one or more of the following features. The interferometer is a Fizeau interferometer. The interferometer includes a first cavity and a second cavity. The first cavity has a first interferometer length, and the second cavity has a second interferometer length, which is different from the first interferometer length. The interferogram data includes a spatially dependent intensity profile of a first interferogram produced by the first cavity and a second interferogram produced by the second cavity.

Implementations of the first example may include one or more of the following features. The camera system includes a photodiode array. The sensor is a temperature sensor and the sensor data includes data representing a temperature of the transmission medium. The sensor is a pressure sensor and the sensor data includes data representing a pressure of the transmission medium. The sensor is a humidity sensor and the sensor data includes data representing a humidity of the transmission medium. The sensor is a carbon dioxide sensor and the sensor data includes data representing a concentration of carbon dioxide in the transmission medium. The sensor is a first sensor, the environmental parameter is a first environmental parameter, and the wavelength measurement system includes a second sensor. The second sensor is configured to sense a second environmental parameter of the transmission medium and generate second sensor data in response. The first and second sensors correspond to different respective sensors selected from the sensor group consisting of a temperature sensor, a pressure sensor, a humidity sensor, and a carbon dioxide sensor. The wavelength measurement system includes a third sensor. The third sensor is configured to sense respective third environmental parameter of the transmission medium and generate third sensor data in response. The first, second, and third sensors correspond to different respective sensors selected from the sensor group consisting of a temperature sensor, a pressure sensor, a humidity sensor, and a carbon dioxide sensor. The sensor is a temperature sensor and the wavelength measurement system includes a pressure sensor, a humidity sensor, and a carbon dioxide sensor each configured to sense respective environmental parameters of the transmission medium.

Implementations of the first example may include one or more of the following features. The sensor is a first temperature sensor and the sensor data includes first sensor data representing a first temperature of the transmission medium. The system includes a second temperature sensor configured to sense a second temperature of an interferometer spacer and generate second sensor data in response. The second sensor data represents a value of the second temperature. The operation includes determining a thermal expansion value of the interferometer according to the second sensor data.

Implementations of the first example may include one or more of the following features. The operations includes calibrating, using a reference laser, the wavelength measurement system prior to receiving the interferogram data and the sensor data. The interferogram data includes first interferogram data. The laser includes a test laser. The optical signal includes a first optical signal. The wavelength of the test laser includes a first wavelength. Calibrating the wavelength measurement system includes: receiving geometric data of the interferometer; receiving second interferogram data from the camera system and the sensor data from the sensor; calculating a first refractive index of the transmission medium based on the sensor data; computing fitted interferometer lengths of the first and second cavities by performing a least-square fitting of a reflected intensity model based on the first refractive index and a second wavelength of the reference laser; and computing Gaussian envelope parameters of the reference laser by performing the least-square fitting of the reflected intensity model based on the fitted interferometer lengths and the second wavelength of the reference laser. The geometric data includes the first and second interferometer lengths and a wedge angle. The second interferogram data is produced by the interferometer based on a second optical signal from the reference laser. The second optical signal is simultaneously incident on the first and second cavities.

Implementations of the first example may include one or more of the following features. Computing the wavelength of the test laser includes: calculating a second refractive index of the transmission medium based on the sensor data; perform the least-square fitting of the reflected intensity model based on the fitted interferometer lengths, the wedge angle, the second refractive index, and the Gaussian envelope parameters; and computing the first wavelength of the test laser using a global optimization algorithm.

In a second example, a wavelength measurement method, includes: receiving an optical signal from a laser and producing an interferogram by the interferometer; receiving the interferogram from the interferometer and generating interferogram data in response by a camera system; sensing an environmental parameter of a transmission medium and generating sensor data in response to a sensor; receiving the interferogram data from the camera system and the sensor data from the sensor by operation of a control system; and computing a wavelength of the laser based on the interferogram data and the sensor data. The interferometer includes two reflective interfaces and the transmission medium between the two reflective surfaces. The interferogram data represents the interferogram. The sensor data represents a value of the environmental parameter.

Implementations of the second example may include one or more of the following features. Producing interferograms is performed by Fizeau interferometers. Producing the interferograms comprises producing a first interferogram by a first cavity of the interferometer and a second interferogram by a second cavity of the interferometer, the first cavity having a first interferometer length, and the second cavity having a second interferometer length different from the first interferometer length.

Implementations of the second example may include one or more of the following features. Sensing the environmental parameter includes operating a temperature sensor to obtain the sensor data including data representing a temperature of the transmission medium. Sensing the environmental parameter includes operating a pressure sensor to obtain the sensor data including data representing a pressure of the transmission medium. Sensing the environmental parameter includes operating a humidity sensor to obtain the sensor data including data representing a humidity of the transmission medium. Sensing the environmental parameter includes operating a carbon dioxide sensor to obtain the sensor data including data representing a concentration of carbon dioxide in the transmission medium. Sensing the environmental parameter includes operating a first sensor to obtain first sensor data; and operating a second sensor to obtain second sensor data. The first and second sensors correspond to different respective sensors selected from the sensor group consisting of a temperature sensor, a pressure sensor, a humidity sensor, and a carbon dioxide sensor. Sensing the environmental parameter includes operating a third sensor to obtain third sensor data. The first, second, and third sensors correspond to different respective sensors selected from the sensor group consisting of a temperature sensor, a pressure sensor, a humidity sensor, and a carbon dioxide sensor. Sensing the environmental parameter includes operating a fourth sensor to obtain fourth sensor data. The first, second, third, and fourth sensors correspond to different respective sensors selected from the sensor group consisting of a temperature sensor, a pressure sensor, a humidity sensor, and a carbon dioxide sensor.

Implementations of the second example may include one or more of the following features. The method further includes operating a first temperature sensor to obtain a first sensor data representing a value of a first temperature of the transmission medium; and sensing a second temperature of an interferometer spacer of the interferometer by a second temperature sensor. The second temperature sensor is configured to generate second sensor data representing a value of the second temperature. The method further includes determining a thermal expansion value of the interferometer according to the second sensor data.

Implementations of the second example may include one or more of the following features. The method further includes: performing calibration, using a reference laser, prior to receiving the interferogram data and the sensor data. Receiving the optical signal from the laser includes receiving a first optical signal from a test laser. Receiving the interferogram data includes receiving first interferogram data. Computing the wavelength includes computing a first wavelength of the test laser. Performing the calibration includes, receiving geometric data of the interferometer; receiving second interferogram data from the camera system and the sensor data from the sensor; calculating a first refractive index of the transmission medium based on the sensor data; computing fitted interferometer lengths of the first and second cavities by performing a least-square fitting of a reflected intensity model based on the first refractive index and a second wavelength of the reference laser; and computing Gaussian envelope parameters of the reference laser by performing the least-square fitting of the reflected intensity model based on the fitted interferometer lengths and the second wavelength of the reference laser. The geometric data includes the first and second interferometer lengths and a wedge angle. The second interferogram data is produced by the interferometer based on a second optical signal from the reference laser. The second optical signal is simultaneously incident on the first and second cavities. Computing the first wavelength of the test laser includes: calculating a second refractive index of the transmission medium based on the sensor data; performing the least-square fitting of the reflected intensity model based on the fitted interferometer lengths, the wedge angle, the second refractive index, and the Gaussian envelope parameters; and computing the wavelength of the test laser using a global optimization algorithm.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of examples have been described. Nevertheless, it will be understood that various modifications can be made. Accordingly, other examples are within the scope of the following claims.

What is claimed is:

1. A wavelength measurement system comprising:
   an interferometer comprising at least two reflective surfaces and a transmission medium between the reflective surfaces, the interferometer configured to receive an optical signal from a laser and produce an interferogram in response;
   a camera system configured to receive the interferogram and generate interferogram data in response, the interferogram data representing the interferogram;
   a sensor configured to sense an environmental parameter of the transmission medium and generate sensor data in response, the sensor data representing a value of the environmental parameter; and
   a control system configured to perform operations comprising:
      receiving the interferogram data from the camera system and the sensor data from the sensor; and
      computing a wavelength of the laser based on the interferogram data and the sensor data.

2. The wavelength measurement system of claim 1, wherein the interferometer is a Fizeau interferometer.

3. The wavelength measurement system of claim 2, wherein the interferometer comprises a first cavity and a second cavity, the first cavity having a first interferometer length, the second cavity having a second interferometer length different from the first interferometer length.

4. The wavelength measurement system of claim 3, wherein the interferogram data comprises a spatially dependent intensity profile of a first interferogram produced by the first cavity and a second interferogram produced by the second cavity.

5. The wavelength measurement system of claim 1, wherein the camera system comprises a photodiode array.

6. The wavelength measurement system of claim 1, wherein the sensor is a temperature sensor and the sensor data comprises data representing a temperature of the transmission medium.

7. The wavelength measurement system of claim 1, wherein the sensor is a pressure sensor and the sensor data comprises data representing a pressure of the transmission medium.

8. The wavelength measurement system of claim 1, wherein the sensor is a humidity sensor and the sensor data comprises data representing a humidity of the transmission medium.

9. The wavelength measurement system of claim 1, wherein the sensor is a carbon dioxide sensor and the sensor data comprises data representing a concentration of carbon dioxide in the transmission medium.

10. The wavelength measurement system of claim 1, wherein the sensor is a first sensor, the environmental parameter is a first environmental parameter, and the wavelength measurement system comprises:
a second sensor, the second sensor configured to sense a second environmental parameter of the transmission medium and generate second sensor data in response; and wherein the first and second sensors correspond to different respective sensors selected from the sensor group consisting of a temperature sensor, a pressure sensor, a humidity sensor, and a carbon dioxide sensor.

11. The wavelength measurement system of claim 10, wherein the wavelength measurement system comprises a third sensor, the third sensor configured to sense respective third environmental parameter of the transmission medium and generate third sensor data in response; and wherein the first, second, and third sensors correspond to different respective sensors selected from the sensor group consisting of a temperature sensor, a pressure sensor, a humidity sensor, and a carbon dioxide sensor.

12. The wavelength measurement system of claim 1, wherein the sensor is a temperature sensor and the wavelength measurement system comprises a pressure sensor, a humidity sensor, and a carbon dioxide sensor each configured to sense respective environmental parameters of the transmission medium.

13. The wavelength measurement system of claim 6, wherein the sensor is a first temperature sensor and the sensor data comprises first sensor data representing a first temperature of the transmission medium, the system comprising: a second temperature sensor configured to sense a second temperature of an interferometer and generate second sensor data in response, the second sensor data representing a value of the second temperature.

14. The wavelength measurement system of claim 13, wherein the operation comprises:
determining a thermal expansion value of the interferometer according to the second sensor data.

15. The wavelength measurement system of claim 1, wherein the operations comprise:
calibrating, using a reference laser, the wavelength measurement system prior to receiving the interferogram data and the sensor data.

16. The wavelength measurement system of claim 15, wherein the interferogram data comprises first interferogram data, the laser comprises a test laser, the optical signal comprises a first optical signal, the wavelength of the test laser comprises a first wavelength; and
wherein calibrating the wavelength measurement system comprises:
receiving geometric data of the interferometer, the geometric data comprising the first and second interferometer lengths and a wedge angle;
receiving second interferogram data from the camera system and the sensor data from the sensor, wherein the second interferogram data is produced by the interferometer based on a second optical signal from the reference laser, the second optical signal is simultaneously incident on the first and second cavities;
calculating a first refractive index of the transmission medium based on the sensor data;
computing fitted interferometer lengths of the first and second cavities by performing a least-square fitting of a reflected intensity model based on the first refractive index and a second wavelength of the reference laser; and
computing Gaussian envelope parameters of the reference laser by performing the least-square fitting of the reflected intensity model based on the fitted interferometer lengths and the second wavelength of the reference laser.

17. The wavelength measurement system of claim 16, wherein computing the wavelength of the test laser comprises:
calculating a second refractive index of the transmission medium based on the sensor data;
performing the least-square fitting of the reflected intensity model based on the fitted interferometer lengths, the wedge angle, the second refractive index, and the Gaussian envelope parameters; and
computing the first wavelength of the test laser using a global optimization algorithm.

18. A wavelength measurement method, comprising:
by operation of an interferometer, receiving an optical signal from a laser and producing an interferogram, the interferometer having at least two reflective interfaces and a transmission medium between the reflective surfaces;
by operation of a camera system, receiving the interferogram from the interferometer and generating interferogram data in response, the interferogram data representing the interferogram;
by operation of a sensor, sensing an environmental parameter of the transmission medium and generating sensor data in response, the sensor data representing a value of the environmental parameter;
receiving the interferogram data from the camera system and the sensor data from the sensor by operation of a control system; and
computing a wavelength of the laser based on the interferogram data and the sensor data.

19. The wavelength measurement method of claim 18, wherein producing the interferogram is performed by a Fizeau interferometer.

20. The wavelength measurement method of claim 19, wherein producing the interferogram comprises producing a first interferogram by a first cavity of the interferometer and a second interferogram by a second cavity of the interferometer, the first cavity having a first interferometer length, and the second cavity having a second interferometer length different from the first interferometer length.

21. The wavelength measurement method of claim 18, wherein sensing the environmental parameter comprises operating a temperature sensor to obtain the sensor data comprising data representing a temperature of the transmission medium.

22. The wavelength measurement method of claim 18, wherein sensing the environmental parameter comprises operating a pressure sensor to obtain the sensor data comprising data representing a pressure of the transmission medium.

23. The wavelength measurement method of claim 18, wherein sensing the environmental parameter comprises operating a humidity sensor to obtain the sensor data comprising data representing a humidity of the transmission medium.

24. The wavelength measurement method of claim 18, wherein sensing the environmental parameter comprises operating a carbon dioxide sensor to obtain the sensor data comprising data representing a concentration of carbon dioxide in the transmission medium.

25. The wavelength measurement method of claim 18, wherein sensing the environmental parameter comprises operating a first sensor to obtain first sensor data; and operating a second sensor to obtain second sensor data, wherein the first and second sensors correspond to different respective sensors selected from the sensor group consisting of a temperature sensor, a pressure sensor, a humidity sensor, and a carbon dioxide sensor.

26. The wavelength measurement method of claim 25, wherein sensing the environmental parameter comprises operating a third sensor to obtain third sensor data, wherein the first, second, and third sensors correspond to different respective sensors selected from the sensor group consisting of a temperature sensor, a pressure sensor, a humidity sensor, and a carbon dioxide sensor.

27. The wavelength measurement method of claim 26, wherein sensing the environmental parameter comprises operating a fourth sensor to obtain fourth sensor data, wherein the first, second, third, and fourth sensors correspond to different respective sensors selected from the sensor group consisting of a temperature sensor, a pressure sensor, a humidity sensor, and a carbon dioxide sensor.

28. The wavelength measurement method of claim 18, further comprising:
   operating a first temperature sensor to obtain a first sensor data representing a value of a first temperature of the transmission medium; and
   sensing a second temperature of an interferometer spacer of the interferometer by a second temperature sensor, the second temperature sensor configured to generate second sensor data representing a value of the second temperature.

29. The wavelength measurement method of claim 28, further comprising:
   determining a thermal expansion value of the interferometer according to the second sensor data.

30. The wavelength measurement method of claim 29, further comprising:
   performing calibration, using a reference laser, prior to receiving the interferogram data and the sensor data; and
   computing the wavelength of the test laser using a global optimization algorithm.

\* \* \* \* \*

UNITED STATES PATENT AND TRADEMARK OFFICE
CERTIFICATE OF CORRECTION

PATENT NO. : 10,948,356 B1
APPLICATION NO. : 16/907469
DATED : March 16, 2021
INVENTOR(S) : Keaveney et al.

Page 1 of 1

It is certified that error appears in the above-identified patent and that said Letters Patent is hereby corrected as shown below:

In the Specification

Column 8, Line 39, after "and", insert -- $\lambda$ --.

Column 8, Line 42, after "wavelength", insert -- $\lambda$ --.

Column 15, Line 47, delete "a" and insert -- $\alpha$ -- therefor.

Column 18, Line 12, delete "the" and insert -- the $+\vec{Z}$ -- therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*